US010190020B2

(12) United States Patent
Iezzi

(10) Patent No.: US 10,190,020 B2
(45) Date of Patent: Jan. 29, 2019

(54) SILOXANE-BASED COATINGS CONTAINING POLYMERS WITH UREA LINKAGES AND TERMINAL ALKOXYSILANES

(71) Applicant: The United States of America, as represented by the Secretary of the Navy, Washington, DC (US)

(72) Inventor: Erick B. Iezzi, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/442,909

(22) Filed: Feb. 27, 2017

(65) Prior Publication Data

US 2017/0183534 A1    Jun. 29, 2017

Related U.S. Application Data

(63) Continuation-in-part of application No. 14/845,407, filed on Sep. 4, 2015, now Pat. No. 9,587,143.

(60) Provisional application No. 62/067,052, filed on Oct. 22, 2014.

(51) Int. Cl.
| | | |
|---|---|---|
| *C09D 175/02* | (2006.01) | |
| *C08L 75/08* | (2006.01) | |
| *C09D 163/00* | (2006.01) | |
| *C08G 77/26* | (2006.01) | |
| *C08G 18/32* | (2006.01) | |
| *C08G 18/83* | (2006.01) | |
| *C08G 18/79* | (2006.01) | |
| *C08G 18/42* | (2006.01) | |
| *C08G 18/28* | (2006.01) | |
| *C09D 183/14* | (2006.01) | |
| *C08G 18/61* | (2006.01) | |
| *C08G 18/66* | (2006.01) | |
| *C09D 175/12* | (2006.01) | |
| *C08G 18/38* | (2006.01) | |
| *C09D 183/10* | (2006.01) | |
| *C08G 77/452* | (2006.01) | |

(52) U.S. Cl.
CPC ......... *C09D 175/02* (2013.01); *C08G 18/289* (2013.01); *C08G 18/3228* (2013.01); *C08G 18/3234* (2013.01); *C08G 18/3237* (2013.01); *C08G 18/3821* (2013.01); *C08G 18/42* (2013.01); *C08G 18/61* (2013.01); *C08G 18/6685* (2013.01); *C08G 18/792* (2013.01); *C08G 18/837* (2013.01); *C08G 77/26* (2013.01); *C08L 75/08* (2013.01); *C09D 163/00* (2013.01); *C09D 175/12* (2013.01); *C09D 183/10* (2013.01); *C09D 183/14* (2013.01); *C08G 77/452* (2013.01)

(58) Field of Classification Search
USPC ..................................... 528/44–88
See application file for complete search history.

(56) References Cited

U.S. PATENT DOCUMENTS

| | | | | |
|---|---|---|---|---|
| 3,632,557 A * | 1/1972 | Brode et al. ........... | C08G 18/10 |
| | | | | 528/28 |
| 2002/0142169 A1 | 10/2002 | Hofacker et al. | | |
| 2004/0132864 A1* | 7/2004 | Shibahara .......... | C08G 18/0823 |
| | | | | 523/176 |
| 2007/0129527 A1* | 6/2007 | Griswold ............... | C08G 18/10 |
| | | | | 528/64 |
| 2011/0065957 A1 | 3/2011 | Bernard et al. | | |
| 2011/0319555 A1 | 12/2011 | Iezzi | | |
| 2014/0350175 A1* | 11/2014 | Dinkar ................. | C08G 65/336 |
| | | | | 524/588 |
| 2015/0368466 A1* | 12/2015 | Kelch .................. | C08G 59/245 |
| | | | | 523/402 |
| 2016/0115351 A1 | 4/2016 | Iezzi | | |
| 2016/0194435 A1* | 7/2016 | Schmatloch ....... | C08G 18/5045 |
| | | | | 156/331.4 |

OTHER PUBLICATIONS

Office Action in EP15852973.5 (dated May 4, 2018).
Search Report and Written Opinion in PCT/US2018/019369 (dated Jun. 25, 2018).

* cited by examiner

*Primary Examiner* — Marc S Zimmer
(74) *Attorney, Agent, or Firm* — US Naval Research Laboratory; Joseph T. Grunkemeyer

(57) ABSTRACT

Polyureas made from amino-functional alkoxysilanes, polyisocyanates, and polyfunctional amino- and/or hydroxyl compounds. The polyureas may be moisture-cured in a 1K system or be included in a 2K system with amino and epoxy or acrylate compounds.

40 Claims, 9 Drawing Sheets

SILOXANE-BASED COATINGS CONTAINING POLYMERS WITH UREA LINKAGES AND TERMINAL ALKOXYSILANES

This application is a continuation-in-part application of U.S. Pat. No. 9,587,143, issued on Mar. 7, 2017, which claims the benefit of U.S. Provisional Application No. 62/067,052, filed on Oct. 22, 2014. These applications and all other publications and patent documents referred to throughout this nonprovisional application are incorporated herein by reference.

TECHNICAL FIELD

The present disclosure is generally related to siloxane-based coatings.

DESCRIPTION OF RELATED ART

Polyurethane topcoats are the current technology used to provide protective camouflage, exterior color stability to UV/sunlight, chemical agent resistance, hydrocarbon and chemical resistance, flexibility, first line corrosion resistance, and a host of other properties for a variety of military assets. The majority of polyurethane topcoats utilized by the military are qualified to either MIL-DTL-53039E (Coating, Aliphatic Polyurethane, Single Component, Chemical Agent Resistant), MIL-DTL-64159B (Camouflage Coating, Water Dispersible Aliphatic Polyurethane, Chemical Agent Resistant), or MIL-PRF-85285E (Coating, Polyurethane, Aircraft and Support Equipment). Unfortunately, these polyurethane coatings contain toxic isocyanate-based materials that can cause serious health issues for both coating applicators and the environment, and the development of coating technologies that are both non-toxic and provide equivalent or greater performance (i.e., functional properties and exterior durability) than polyurethane coatings are highly desired by all branches of the military.

An isocyanate is a highly reactive functional group that reacts with a hydroxyl-functional molecule to form a carbamate linkage (aka "urethane"). When several urethane linkages are formed, such as in the case of a coating, the resulting material is referred to as a polyurethane. Isocyanates can easily react to form polyurethanes at ambient temperatures, although the use of a catalyst or heat can be utilized to increase the rate of reaction. Isocyanates can form polyurethanes using either a two-component (2K) system, which requires mixing of the isocyanate- and hydroxyl-functional component prior to application, or a single-component (1K) system, where the isocyanate-based polymers react with moisture to form carbamic acids, which then decarboxylate to primary amines and subsequently react with remaining isocyanates in the coating to form a self-crosslinked network.

Polyurethane coatings are based on aromatic or aliphatic isocyanates. Aromatic polyurethanes contain aromatic isocyanates, which include methylene diphenyl diisocyanate (MDI), toluene diisocyanate (TDI), and diphenyl carbodiamide-diisocyanate (CD). Aromatic polyurethanes possess excellent hardness and chemical resistance, although they exhibit generally poor flexibility and weathering performance. As a result, aromatic polyurethanes are typically employed as primers and for chemically resistant interior linings where they are not exposed to UV radiation from sunlight. Aliphatic (and cycloaliphatic) polyurethanes are based on variations of either hydrogenated aromatic diisocyanates or linear diisocyanates, such as isophorone diisocyanate (IPDI), methylene dicyclohexyl diisocyanate (HMDI), and hexamethylene 1,6-diisocyanate (HDI). Aliphatic isocyanate-based polyurethanes possess good weathering performance (i.e., color and gloss stability) and flexibility, which render them an excellent choice for military and aerospace topcoats, automotive refinish clearcoats, and high-performance architectural coatings. Although the aforementioned materials are examples of diisocyanate (two reactive groups per molecule) molecules, it is not uncommon for coatings to contain polymeric isocyanates, such as hexamethylene diisocyanate homopolymers. However, these higher molecular weight and less volatile adducts are still considered toxic.

Most isocyanates are highly reactive molecules with a high vapor pressure, and airborne exposure to individuals can often result in severe irritation to the eyes, nose, throat, and skin. The spraying (aerosolized particles), brushing, or rolling of materials that contain isocyanates can induce symptoms of asthma, such as coughing, shortness of breath, wheezing, swelling of the arms and legs, and tightness of chest, in addition to hypersensitivity pneumonitis, which is a lung disease whose symptoms include fever, body aches, and cough with phlegm or sputum. The Department of Health Services of California estimates that about one in twenty people who work with isocyanates become "sensitized", meaning that an individual can experience a variety of adverse health conditions from subsequent exposures, even if the exposure is at extremely low levels. To reduce exposure, special personal protective equipment (PPE), such as Tyvek® suites, nitrile gloves, and forced air respirators must be worn by individuals when applying isocyanate-containing materials, such as the current polyurethane topcoats used by the military.

Advances in organosilicon chemistry have led to the large scale production of "hybrid" materials that contain both organic (e.g., carbon, hydrogen) and inorganic (silicon) segments. Coatings that contain silicon-oxygen bonds possess an inherent durability advantage over traditional organic-based materials. The Si—O bond, which has a bond enthalpy of 110 kcal/mol, is stronger than the carbon-hydrogen (99 kcal/mol) and carbon-carbon (83 kcal/mol) bonds found in organic coatings, such as polyurethanes, thereby leading to an increase in thermal stability and resistance to oxidative degradation by UV/sunlight. Organosilicon-based materials, such as polysiloxanes, are also relatively non-toxic to humans.

Two-component (2K) polysiloxane coatings, also referred to as "siloxanes", are commercially available by several manufacturers for use in the protective and marine coatings markets. These coatings are based on hybrid cure materials that contain both reactive organic groups and moisture-curable alkoxysilane groups, where one portion of the coating is crosslinked via the ambient reaction between organic groups, such as amines and epoxies, while the other portion forms a three-dimensional polysiloxane network via moisture hydrolysis of the alkoxysilanes and condensation of the resulting silanols. These coatings offer good exterior durability, hardness, and chemical resistance. However, these coatings suffer from low flexibility due to their high crosslink density, which prohibits them from being used as topcoats for military aerospace and vehicle applications.

BRIEF SUMMARY

Disclosed herein is a polyurea made by a method comprising: reacting an amino-functional alkoxysilane with a polyisocyanate to form one or more adducts having an unreacted isocyanate group; and reacting the adducts with one or more polyfunctional amino- and/or hydroxyl compounds and a polyisocyanate to form the polyurea. At least one of the polyfunctional amino- and/or hydroxyl compounds comprises an amino group. At least one of the polyfunctional amino- and/or hydroxyl compounds comprises a hydroxyl group. Isocyanate groups do not react with other isocyanate groups. The polyurea comprises at least two residues of the polyfunctional amino- and/or hydroxyl compounds. The polyurea contains no unreacted isocyanate groups.

Also disclosed herein is a method comprising: providing a composition comprising a polyurea; and moisture-curing the composition. The polyurea is made by a method comprising: reacting an amino-functional alkoxysilane with a polyisocyanate to form one or more adducts having an unreacted isocyanate group; and reacting the adducts with one or more polyfunctional amino- and/or hydroxyl compounds and a polyisocyanate to form the polyurea. The polyurea comprises at least two residues of the polyfunctional amino- and/or hydroxyl compounds. Isocyanate groups do not react with other isocyanate groups. The polyurea contains no unreacted isocyanate groups.

Also disclosed herein is a composition comprising: an amine-functional compound or an epoxy- or acrylate-functional compound and the immediately above polyurea. The composition does not comprise both the amine-functional compound and the epoxy- or acrylate-functional compound.

Also disclosed herein is a coating composition comprising: an amine-functional compound; the immediately above polyurea; and an epoxy- or acrylate-functional compound. The coating composition is a two-component system.

Also disclosed herein is a method comprising: providing a composition comprising a polyurea and moisture-curing the composition. The polyurea is made by a method comprising: reacting an amino-functional alkoxysilane with a polyisocyanate to form an adduct; and reacting the adduct with a compound having two or more amino and/or hydroxyl groups to form the polyurea. The polyurea contains no unreacted isocyanate groups.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

Figure 1:
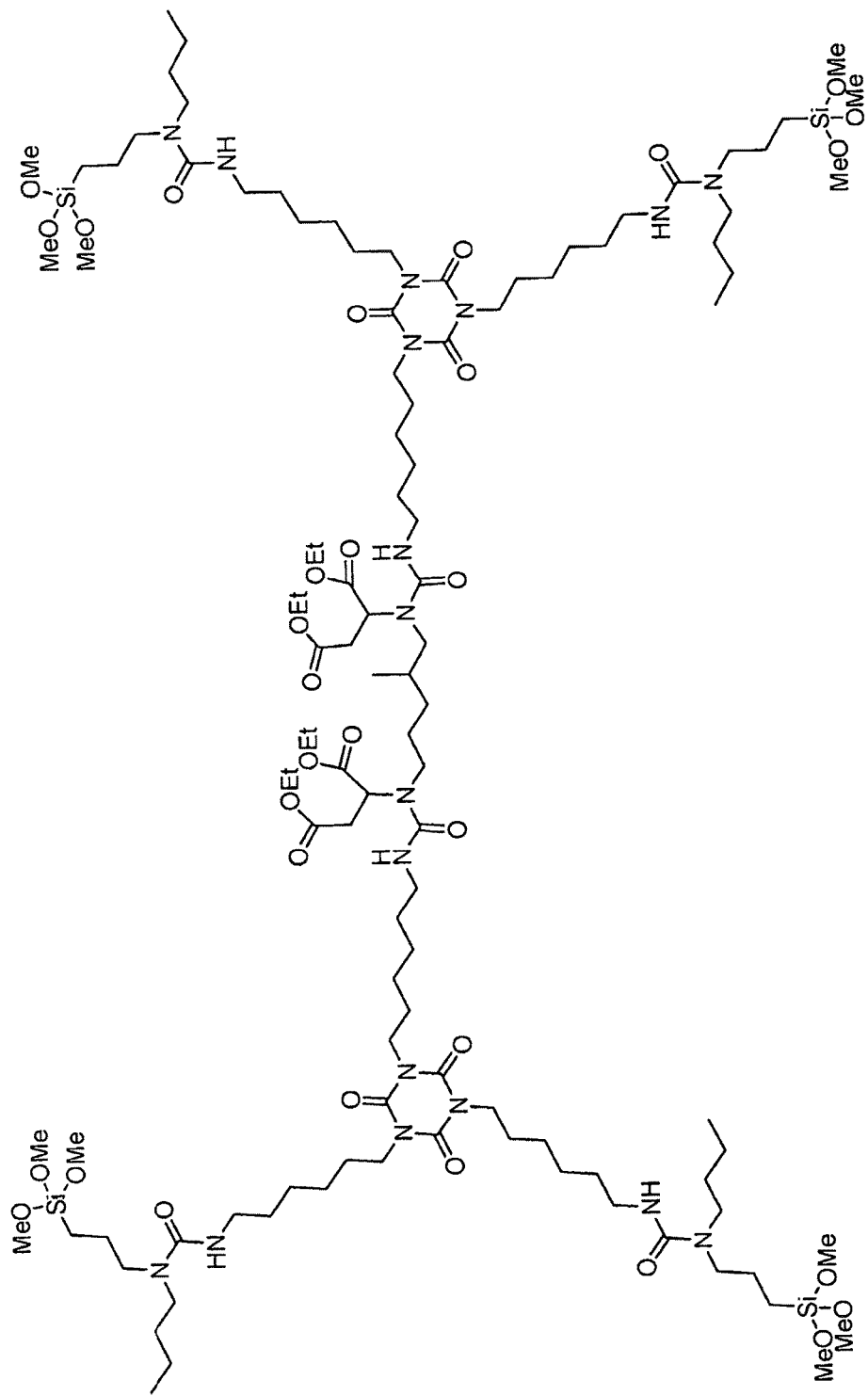
FIG. 1 shows a polyurea having an aspartic ester-containing backbone.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed are flexible, exterior durable, two-component (2K) siloxane-based coatings using flexible urea polymers with terminal alkoxysilanes. These polymers possess urea linkages (N-substituted and non-N-substituted), a flexible backbone, and moisture-curable alkoxysilane groups that hydrolyze and condense to form exterior durable polysiloxane linkages. These polymers are compatible with materials used in two-component siloxane-based systems, thereby allowing the crosslink density of the two components to be reduced so that flexibility is improved, yet still maintaining sufficient coating hardness, cure times, solvent resistance and exterior durability (e.g., color and gloss retention). Coatings based on these systems have application as gloss, semi-gloss, and flat/matte finish topcoats for military and commercial assets. The coatings are also low in viscosity and volatile organic compounds (VOCs), and are easily spray-applied via high-volume, low-pressure (HVLP) equipment. These coatings are isocyanate-free and can provide a safer alternative to the polyurethane topcoats currently used by the military, commercial aerospace, and the automotive refinish markets.

The two-component (2K) polysiloxane coatings contain flexible polymers with urea linkages and terminal alkoxysilanes. The urea linkages in the polymers can be N-substituted or non-N-substituted, although N-substituted may be preferred. The urea linkages are located near the terminal alkoxysilanes and the flexible backbone. The flexible backbone may be aliphatic, cycloaliphatic, aromatic, polyester, polyurethane, polycarbonate, polyether, polysulfide, polysiloxane, or a combination thereof, and the N-substituted groups can be C1-C12 alkyl, cycloalkyl, aryl, ester-containing aliphatic, ester-containing fluorinated aliphatic, amide-containing aliphatic, polysiloxane, or any combination thereof. The flexible alkoxysilane-terminated urea polymer, based on total binder solids, can range from 1-50 weight % of the formulation.

In addition to the flexible polymer, the two components (two parts that react once mixed) in the coating are based on amine- and epoxy- or amine- and acrylate-functional materials. The amines can be a hybrid organic-inorganic material, such as an amino-functional polydimethylsiloxane, 3-aminopropyltriethoxysilane, or 3-aminopropylmethyldiethoxysilane, or an organic-based material, such as an amino-functional polyether. The epoxy can be a hybrid material, such as an epoxy-functional polydimethyldiphenylsiloxane, or an organic material, such as a cycloaliphatic epoxy or aliphatic epoxy. Acrylic-functional materials, such as 1,6-hexanedioldiacrylate, can be used in lieu or in combination with epoxies. These two-component coatings can also contain pigments, fillers, additives, solvents, and catalysts.

The coating may be made by mixing the two components, applying the mixture to a surface, and allowing the mixture to cure to a coating. Any apparatus for mixing and applying the mixture may be used, and such equipment is known in the art. The mixing and applying may also be performed simultaneously.

Either or both of the components may optionally include one or more of a catalyst, a reactive diluent, a pigment, a filler, a solvent, or an additive, though pigments and fillers are not typical in the alkoxysilane-terminated polyurea component and catalysts are not typically in the epoxy or acrylate component. Such materials are known in the art of 2K coatings. The mixture may be formulated with, for example, up to 50 wt %, 1-50 wt %, or 5-50 wt % of the alkoxysilane-terminated polyurea.

The first component (part A) includes an amine-functional compound and an alkoxysilane-terminated polyurea. The amine-functional compound can be a monoamine, diamine, triamine, primary amine, or secondary amine. Suitable amine-functional compounds include, but are not limited to, an amino-functional polydimethylsiloxane, an amino-functional polydimethyldiphenylsiloxane, 3-aminopropyltriethoxysilane, 3-aminopropyltrimethoxysilane, 3-aminopropylmethyldiethoxysilane, 1-aminomethyltrimethoxysilane, an aliphatic monoamine, an aliphatic diamine, a cycloaliphatic diamine, or an amino-functional polyether.

The polyurea has terminal alkoxysilane groups formed by reacting an amine-functional alkoxysilane with a polyisocyanate to form an adduct, and has no unreacted isocyanate groups. As used herein, "no unreacted isocyanate groups" means that enough isocyanate-reactive groups are used to react with all isocyanate groups, though it is possible that trace amounts of unreacted isocyanate remain. When there is an excess of isocyanate groups relative to amine groups, the adduct may be reacted with a difunctional amino- or hydroxyl compound to consume all unreacted isocyanate groups. A typical reaction scheme is shown below. Note that the use of a diol forms urethane groups in the polyurea. Each of the reactants may include more than one such compound of the general structure. Other reactants may be present or excluded.

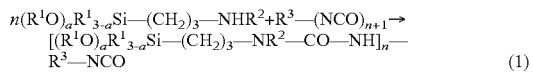  (1)

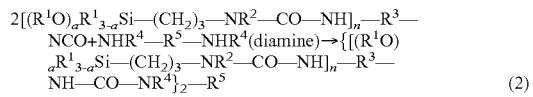  (2)

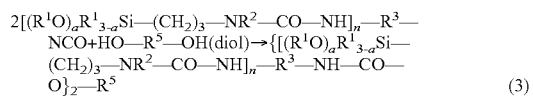  (3)

The value a is 1, 2, or 3, in that there is at least one alkoxy group bound to the silicon atom. The value n is a positive integer, in that the polyisocyanate has n+1 isocyanate groups. The polyurea may be a mixture of the above compounds with other polyureas. The mixture may include a small amount of polyureas where all the isocyanate groups are reacted with amine-functional alkoxysilanes as shown below.

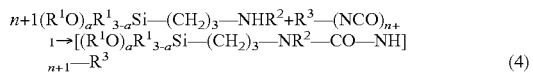  (4)

Larger molecules may also be made, especially when less amine-functional alkoxysilane is used, as shown below using a diol. However, an amount of amine-functional alkoxysilane is typically used so that compounds in the first set of reactions above predominate. Thus, the first component may include at least one such compound having a molecular weight of less than 3000, 2500, or 2000, and at least 50, 75, or 90 wt % of all the polyureas in the first component may be of such molecular weights.

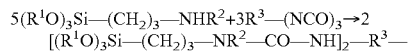

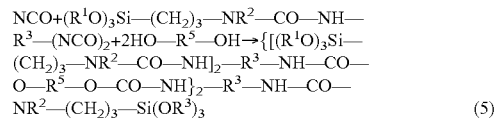  (5)

Each $R^1$ group of the amine-functional alkoxysilane may be an independently selected alkyl group, such that all the $R^1$ groups are the same or may be of more than one type. Each $R^2$ group of the amine-functional alkoxysilane may be an independently selected hydrogen, aryl, alkyl, cycloalkyl, ester-containing aliphatic, ester-containing fluorinated aliphatic, amide-containing aliphatic, or polysiloxane. The amine-functional alkoxysilane is a different compound from the polyurea itself, and may be free of urea groups. Suitable amine-functional alkoxysilanes include, but are not limited to, N-butyl-3-aminopropyltrimethoxysilane, 3-aminopropyltriethoxysilane, 3-aminopropyltrimethoxysilane, 3-aminopropylmethyldiethoxysilane, N-methyl-3-aminopropyltrimethoxysilane, or N-[3-(trimethoxysilyl)propyl]-β-alanine butyl ester.

The $R^3$ group of the polyisocyanate may be aliphatic, cycloaliphatic, or aromatic. Aliphatic isocyanates may provide for better flexibility and weatherability in the coating. Suitable polyisocyanates include, but are not limited to, hexamethylene diisocyanate, a homopolymer of hexamethylene diisocyanate, toluene diisocyanate, methylene diphenyl diisocyanate, and mixtures thereof. Commercially available polymeric isocyanates may include mixtures, such as dimers and trimers of hexamethylene diisocyanate.

Each $R^4$ group of the difunctional amino compound may be an independently selected hydrogen, aryl, alkyl, cycloalkyl, ester-containing aliphatic, ester-containing fluorinated aliphatic, amide-containing aliphatic, or polysiloxane. Each $R^5$ group of the difunctional amino- or hydroxyl compound may include an independently selected aliphatic, cycloaliphatic, aromatic, polyester, polyether, polysulfide, polyurethane, polycarbonate, polysiloxane, and any combination thereof. Suitable difunctional amino- or hydroxyl compounds include, but are not limited to, aspartic acid, N,N'-(2-methyl-1,5-pentanediyl)bis-1,1',4,4'-tetraethyl ester, an unsaturated polyester, a caprolactone-based polyester, or a hydroxyl-propyl terminated polydimethylsiloxane.

The alkoxysilane-terminated polyurea may also be any of those disclosed in U.S. Pat. No. 9,139,753 or U.S. Patent Appl. Publ. No. 2015/0291837, both of which are incorporated herein by reference, and certain subject matter thereof included below. The teachings of these applications may apply to the presently disclosed polyureas.

In an exemplary embodiment, the aforementioned polymer is formed by reacting 30-95% of the isocyanate groups on the polyisocyanate with a non-substituted or N-substituted amino-functional alkoxysilane, and 5-70% of the isocyanate groups on the aliphatic polyisocyanate with a diamine, secondary diamine, or diol, such that no unreacted isocyanate remains in the polymer. Addition of the diamine or diol forms larger molecules, which increases the overall molecular weight of the polymer.

The polyisocyanate can be aliphatic, cycloaliphatic or aromatic. Aliphatic polyisocyanates are more weatherable (i.e., exterior durable) than aromatic polyisocyanates, thereby providing greater color stability when utilized for exterior coatings. Aliphatic polyisocyanates can have various numbers of reactive isocyanate (NCO) groups per molecule, depending on their structure. Typically, the number ranges from 2.5 to 5.5. For the present coating composition, the aliphatic polyisocyanate may have greater than 2

NCO groups per molecule. Suitable aliphatic polyisocyanates include, but are not limited to, structures based on isocyanurates (e.g., HDI and IPDI trimers), biurets, uretdiones, allophanates, oxadiazinetriones, iminooxadiazinedione, and prepolymers containing urethanes. Mixtures of these isocyanates can also be used. There are many commercially available aromatic, aliphatic, and cycloaliphatic polyisocyanates.

The N-substituted amino-functional alkoxysilane can be N-substituted 3-aminopropyltrialkoxysilane, N-substituted 3-aminopropylalkyldialkoxysilane or N-substituted dialkyl-alkoxysilane, where the alkyl group attached to the silicon atom can be methyl or ethyl, and the alkoxy group attached to the silicon atom can be methoxy, ethoxy, n-propoxy, or n-butoxy.

The N-substituted group of the N-substituted amino-functional alkoxysilane can be C1-C12 alkyl, cycloalkyl, or aryl. Examples include, but are not limited to, N-methyl-3-aminopropyltrimethoxysilane, N-ethyl-3-aminopropyltriethoxysilane, N-methyl-3-aminopropyltributoxysilane, N-ethyl-3-aminopropyltripropoxysilane, N-iso-propyl-3-aminopropyltrimethoxysilane, N-tert-butyl-3-aminopropyltrimethoxysilane, N-butyl-3-aminopropyltrimethoxysilane, N-butyl-3-aminopropylmethyldimethoxysilane, N-butyl-3-aminopropyldimethylmethoxysilane, N-butyl-3-aminopropyltriethoxysilane, N-butyl-3-aminopropyltripropoxysilane, N-butyl-3-aminopropyltributoxysilane, N-iso-butyl-3-aminopropyltrimethoxysilane, N-cyclohexyl-3-aminopropyltrimethoxysilane, N-hexyl-3-aminopropyltrimethoxysilane, N-nonyl-3-aminopropytrimethoxysilane and N-dodecyl-3-aminopropyltrimethoxysilane, and N-phenyl-3-aminopropyltrimethoxysilane. Many of these are commercially available.

The N-substituted group of the N-substituted amino-functional alkoxysilane can also be an ester-containing aliphatic or ester-containing fluorinated aliphatic, which are formed by the Michael Addition (conjugate addition) reaction between a molecule with a reactive "ene" group, such as an acrylate, and 3-aminopropyltrialkoxysilane, 3-aminopropylalkyldialkoxysilane, or 3-aminopropyldialkylalkoxysilane. Conditions for forming Michael Addition adducts with an amine are well known in the literature. Suitable acrylates include, but are not limited to, methyl acrylate, ethyl acrylate, butyl acrylate, cyclohexyl acrylate, hexyl acrylate, 2-ethylhexyl acrylate, octyl acrylate, 4-tert-butyl-cyclohexyl acrylate, diethyl maleate, dimethyl maleate, dibutyl maleate, ethylene glycol methyl ether acrylate, 1,1,1,3,3,3-hexafluoroisopropyl acrylate, 2,2,2-trifluoroethyl acrylate, and 3,3,4,4,5,5,6,6,7,7,8,8,8-tridecafluorooctyl acrylate. Examples include, but are not limited to, methyl 3-((3-(trimethoxysilyl)propyl)amino)propanoate, butyl 3-((3-(trimethoxysilyl)propyl)amino)propanoate, 2-ethylhexyl 3-((3-(trimethoxysilyl)propyl)amino)propanoate, octyl 3-((3-(trimethoxysilyl)propyl)amino)propanoate, 3,3,3-trifluoropropyl 3-((3-(trimethoxysilyl)propyl)amino)propanoate, dimethyl (3-(trimethoxysilyl)propyl)aspartate, and diethyl (3-(trimethoxysilyl)propyl)aspartate.

The N-substituted group of the N-substituted amino-functional alkoxysilane can also be an amide-containing aliphatic, which is formed by the Michael Addition (conjugate addition) reaction between a molecule with a reactive "ene" group, such as an acrylamide, and 3-aminopropyltrialkoxysilane, 3-aminopropylalkyldialkoxysilane, or 3-aminopropyldialkylalkoxysilane. Suitable acrylamides include, but are not limited to, N-ethylacrylamide, N-propylacrylamide, N-tert-butylacrylamide, N-cyclohexylacrylamide, N-ethyl maleimide, and N,N'-diethylmaleamide. Examples include, but are not limited to, N-propyl-3-((3-(trimethoxysilyl)propyl)amino)propanamide, N-butyl-3-((3-(trimethoxysilyl)propyl)amino)propanamide, N-cyclohexyl-3-((3-(trimethoxysilyl)propyl)amino)propanamide, and 1-ethyl-3-((3-(trimethoxysilyl)propyl)amino)pyrrolidine-2,5-dione.

The secondary diamine is a molecule that contains two reactive secondary amine groups, or N-substituted groups, with a chain of atoms between. These secondary diamines are used for reacting with the isocyanate groups, extending the chain length between the terminal alkoxysilanes, and increasing the overall molecular weight of the N-substituted urea polymer. The secondary diamines form N-substituted urea linkages once reacted with the isocyanate groups. The secondary diamines provide increased flexibility, exterior durability, and faster tack-free times. A mixture of secondary diamines can be used to provide tailored flexibility and hardness. The secondary diamine chain extender can be an aliphatic, cycloaliphatic, or aromatic chain with secondary diamines, such as a bis(secondary diamine). The secondary diamine chain extender can also be, but is not limited to, a dimethylpolysiloxane chain with secondary diamines, a methylphenylpolysiloxane chain with secondary diamines, a polyether chain with secondary diamines, a polysulfide chain with secondary diamines, or a mixture thereof.

The N-substituted groups of the N-substituted secondary diamines can be C1-C12 alkyl, cycloalkyl, or ester-containing aliphatic. The N-substituted groups can be produced by reductive amination. The N-substituted groups can also be produced by reacting an amine with a molecule containing a reactive "ene" group, such as an acrylate or maleate, via a Michael Addition (conjugate addition) reaction. Suitable N-substituted secondary diamines include, but are not limited to, the following:

| Structure | Name |
|---|---|
|  | $N^1,N^3$-dimethylpropane-1,3-diamine |
|  | $N^1,N^3$-diethylpropane-1,3-diamine |
|  | $N^1,N^5$-diisopropyl-2-methylpentane-1,5-diamine |

-continued

| Structure | Name |
|---|---|
| | $N^1,N^6$-dimethylhexane-1,6-diamine |
| | $N^1,N^6$-bis(3,3-dimethylbutan-2-yl)hexane-1,6-diamine |
| | 1,1'-(1,2-phenylene)bis(N-methylmethanamine) |
| | N,3,3,5-tetramethyl-5-((methylamino)methyl)cyclohexan-1-amine |
| | N-isopropyl-3-((isopropylamino)methyl)-3,5,5-trimethylcyclohexan-1-amine |
| | tetraethyl 2,2'-((2-methylpentane-1,5-diyl)bis(azanediyl))disuccinate |
| | 4,4'-methylenebis(N-isopropylcyclohexan-1-amine) |
| | tetraethyl 2,2'-((methylenebis(cyclohexane-4,1-diyl)bis(azanediyl))disuccinate |
| | 4,4'-methylenebis(N-(sec-butyl)cyclohexan-1-amine) |

| Structure | Name |
|---|---|
| BuO-CH2CH2-C(=O)-NH-(CH2)6-NH-CH2CH2-C(=O)-OBu | dibutyl 3,3'-(hexane-1,6-diylbis(azanediyl))dipropionate |
| CH3-NH-(CH2)3-Si(CH3)2-O-Si(CH3)2-(CH2)3-NH-CH3 | 3,3'-(1,1,3,3-tetramethyldisiloxane-1,3-diyl)bis(N-methylpropan-1-amine) |
| (iPr)NH-(CH2)3-Si(CH3)2-[O-Si(CH3)2]$_n$-O-Si(CH3)2-(CH2)3-NH(iPr) | N,N'-isopropylaminopropyl terminated polydimethylsiloxane |
| Et-NH-CH2-CH(CH3)-Si(CH3)2-[O-Si(CH3)2]$_n$-O-Si(CH3)2-CH2-CH(CH3)-NH-Et | N,N'-ethylaminoisobutyl terminated polydimethylsiloxane |

Several secondary diamines are commercially available.

A person skilled in the art understands that secondary triamines, secondary tetramines, secondary pentaamines, or larger, could also be utilized to increase molecular weight, although the viscosity of the resulting N-substituted polyurea polymer would be greater than if using a similar sized secondary diamine.

As discussed, numerous aliphatic, cycloaliphatic or aromatic polyisocyanates, diamines or diols, and N-substituted or non-N-substituted amino-functional alkoxysilanes can be utilized to provide alkoxysilane-terminated polyureas, thus providing the ability to generate a large variety of polymers that possess differences in molecular weight, structure, and properties (e.g., cure times, hardness, flexibility, solvent resistance and exterior weathering resistance).

In an example synthesis of an N-substituted urea polymer with terminal alkoxysilanes, the polymer is the reaction product of (i) an aliphatic, cycloaliphatic or aromatic polyisocyanate with at least 2 isocyanate (NCO) reactive groups per molecule, where (ii) 30-95% of the isocyanate groups are reacted with an N-substituted amino-functional alkoxysilane, and (iii) 5-70% of the isocyanate groups are reacted with a diamine, secondary diamine or diol chain extender, such that no unreacted isocyanate remains in said polymer. Preferably, the N-substituted urea polymer with terminal alkoxysilanes is the reaction product of (i) an aliphatic, cycloaliphatic or aromatic polyisocyanate with at least 2 isocyanate (NCO) reactive groups per molecule, where (ii) 50-80% of the isocyanate groups are reacted with an N-substituted amino-functional alkoxysilane, and (iii) 20-50% of the isocyanate groups are reacted with a diamine, secondary diamine or diol chain extender, such that no unreacted isocyanate remains in said polymer. More preferably, the N-substituted urea polymer with terminal alkoxysilanes is the reaction product of (i) an aliphatic, cycloaliphatic or aromatic polyisocyanate with at least 2 isocyanate (NCO) reactive groups per molecule, where (ii) 60-70% of the isocyanate groups are reacted with an N-substituted amino-functional alkoxysilane, and (iii) 30-40% of the isocyanate groups are reacted with a diamine, secondary diamine, or diol chain extender, such that no unreacted isocyanate remains in said polymer.

A person skilled in the art understands that a small amount of isocyanate groups (e.g., 1-5%) could remain unreacted in the polymer, and thereby could be used to assist with adhesion to a substrate, or could be used to react with an isocyanate-reactive material that is not discussed herein. However, reacting a small percentage of the isocyanate groups on a polymer with a non-disclosed material is not expected to change the properties of the polymer, and should not be considered a separate polymer. For the purpose of making isocyanate-free coatings, it is recommended that all isocyanate groups be reacted during synthesis of the N-substituted urea polymer.

Figure 5:
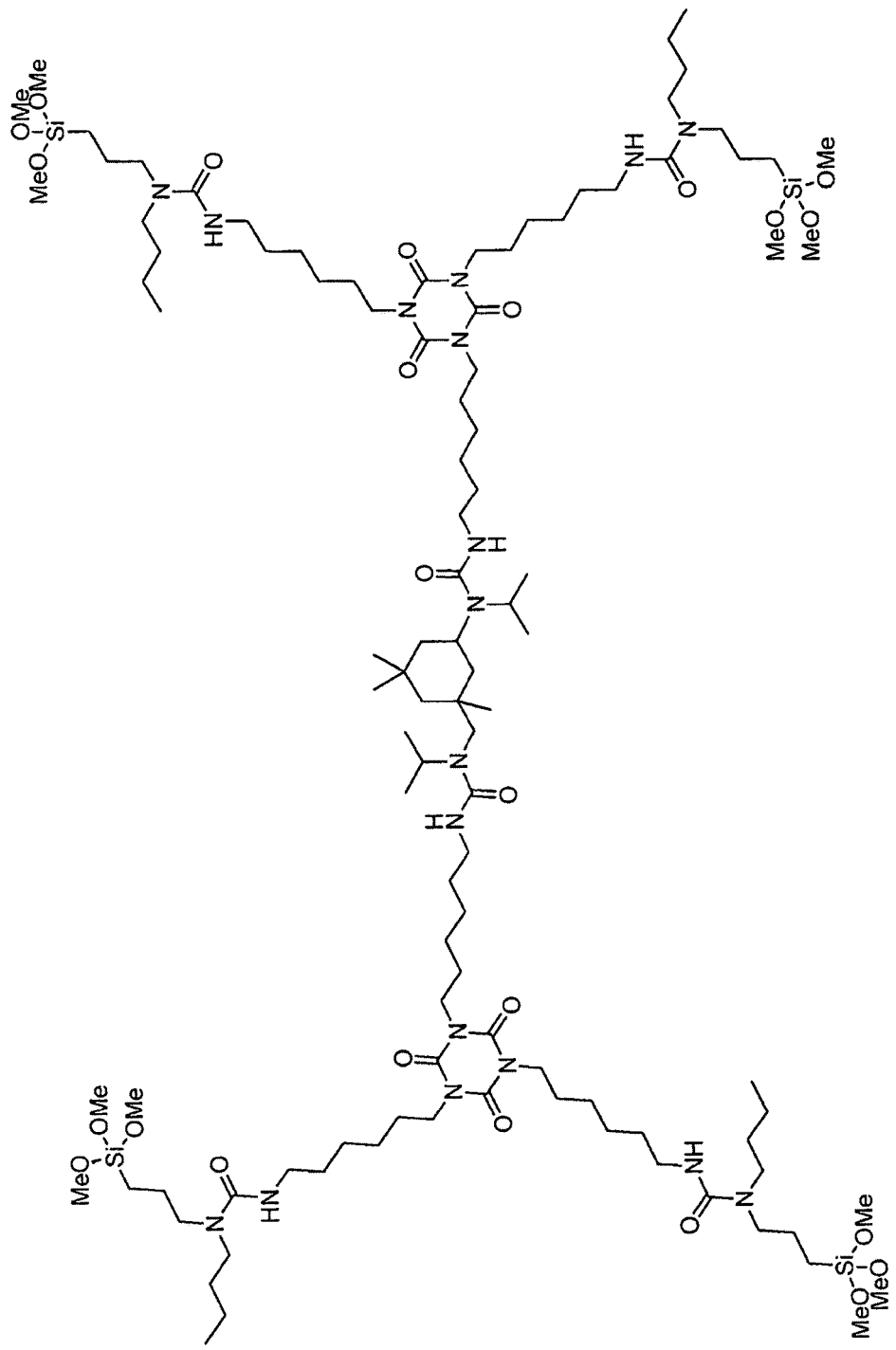
FIG. 5 shows a polyurea having a cycloaliphatic backbone.

The structure in FIG. 5 is an example of an N-substituted urea polymer with terminal alkoxysilanes that is synthesized using an aliphatic polyisocyanate based on an HDI isocyanurate trimer, N-butyl-3-aminopropyltrimethoxysilane (an N-substituted amino-functional alkoxysilane), and N-isopropyl-3-((isopropylamino)methyl)-3,5,5-trimethylcyclohexan-1-amine (a cycloaliphatic secondary diamine). In this example, all newly formed N-substituted urea groups possess either a butyl or isopropyl group.

Figure 6:
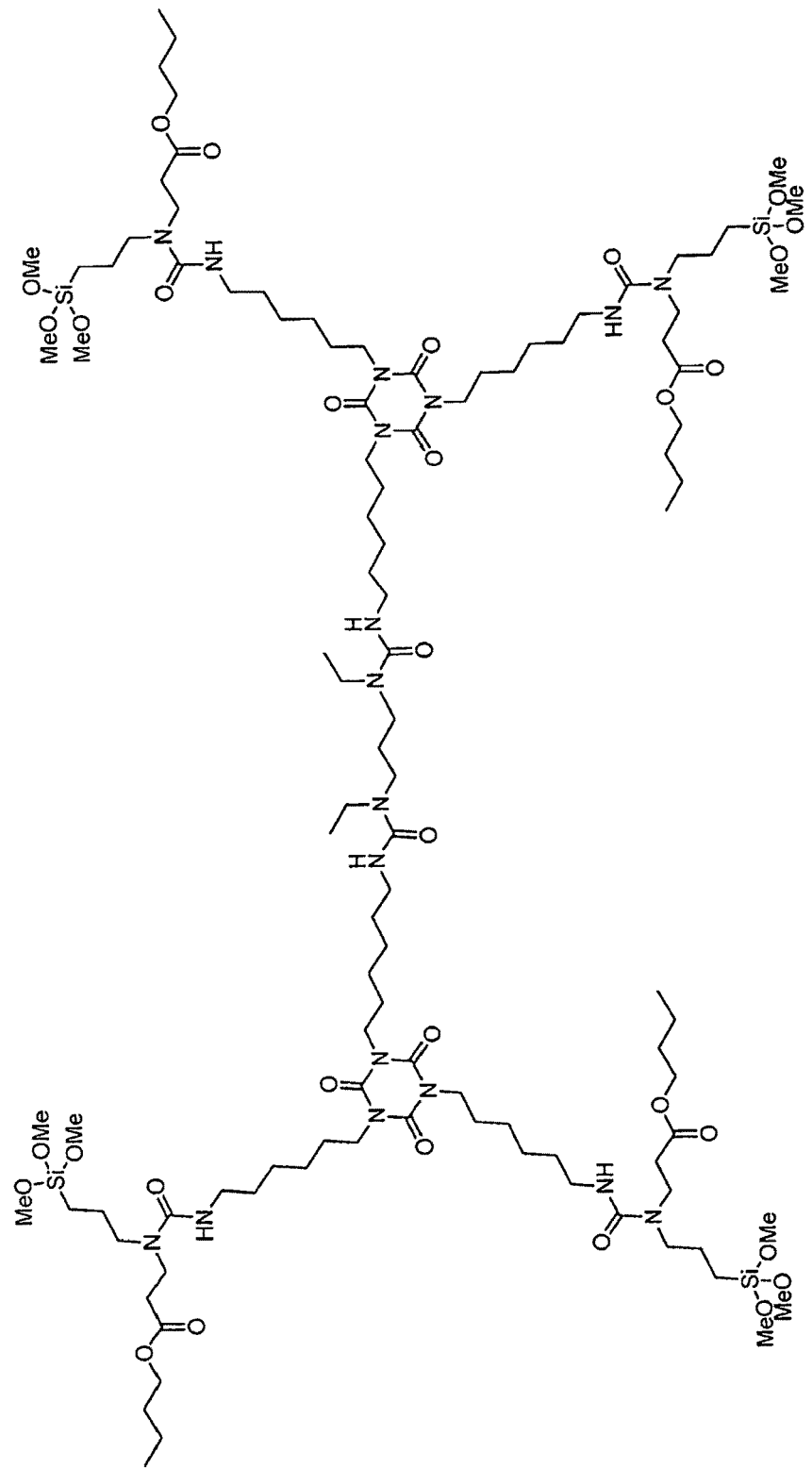
FIG. 6 shows a polyurea having an aliphatic backbone and ester-containing N-substituted groups.

The structure in FIG. 6 is an example of an N-substituted urea polymer with terminal alkoxysilanes that is synthesized using an aliphatic polyisocyanate based on an HDI isocyanurate trimer, an N-substituted amino-functional alkoxysilane formed from the Michael Addition reaction of butyl acrylate and 3-aminopropyltrimethoxysilane, and $N^1,N^3$-diethylpropane-1,3-diamine (an aliphatic secondary diamine).

Alternative structures of N-substituted urea polymers with extended chains and terminal alkoxysilanes can be formed by utilizing a mixture of two different aliphatic isocyanates, an N-substituted amino-functional alkoxysilane, and a secondary diamine.

Figure 7:
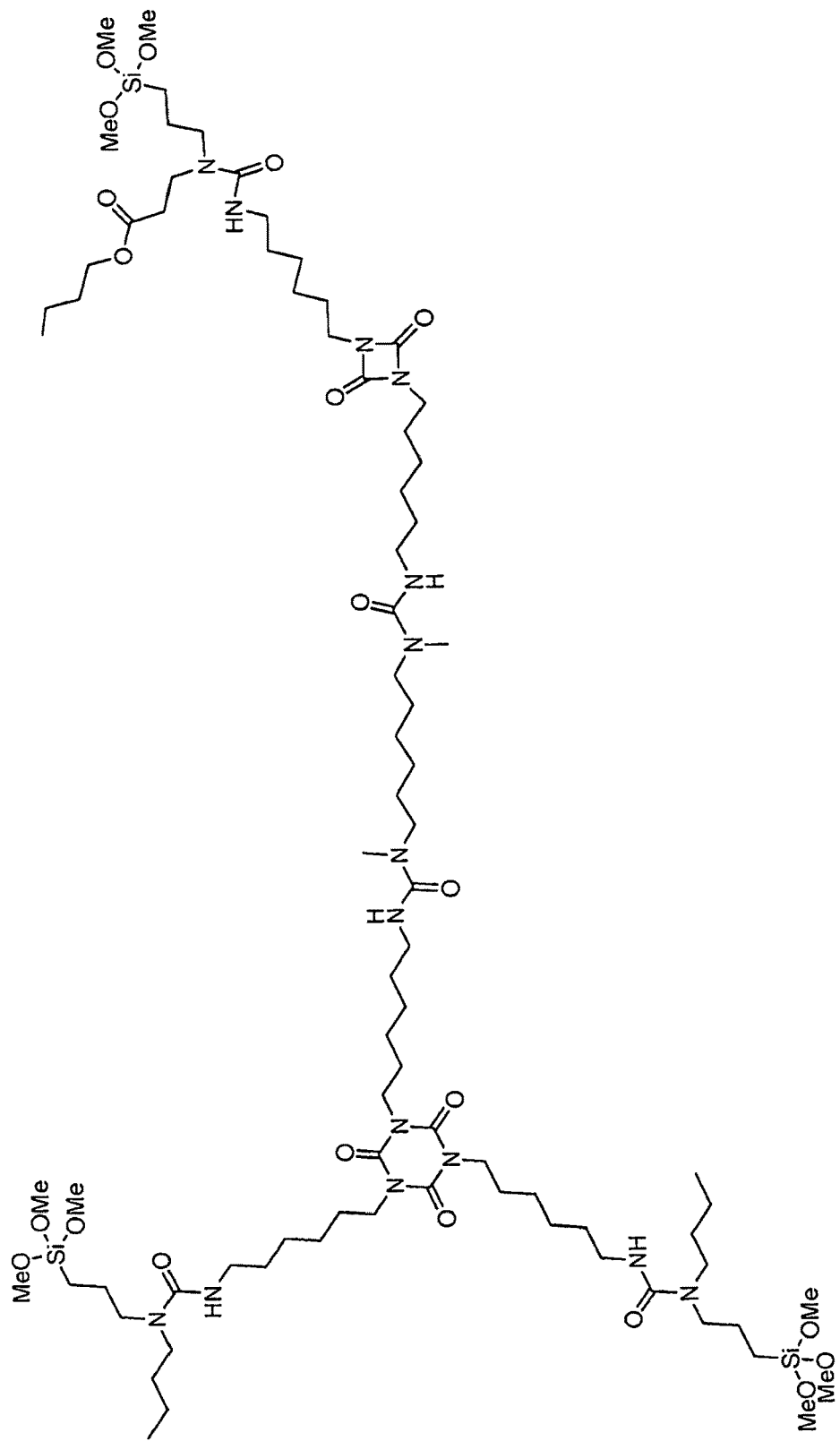
FIG. 7 shows a polyurea having an asymmetric structure and ester-containing N-substituted groups.

The structure in FIG. 7 is an example of an N-substituted urea polymer with terminal alkoxysilanes that is synthesized using a 1:1 mixture of an aliphatic polyisocyanate based on an HDI isocyanurate trimer and an aliphatic polyisocyanate based on a uretdione, N-butyl-3-aminopropyltrimethoxysilane (an N-substituted amino-functional alkoxysilane), and $N^1,N^6$-dimethylhexane-1,6-diamine (an aliphatic secondary diamine). The N-substituted amino-functional alkoxysilane is reacted with ~60% of the isocyanate groups, whereas the secondary diamine is reacted with ~40% of the isocyanate groups. The structure is asymmetric due to the use of two different aliphatic polyisocyanates.

Figure 8:
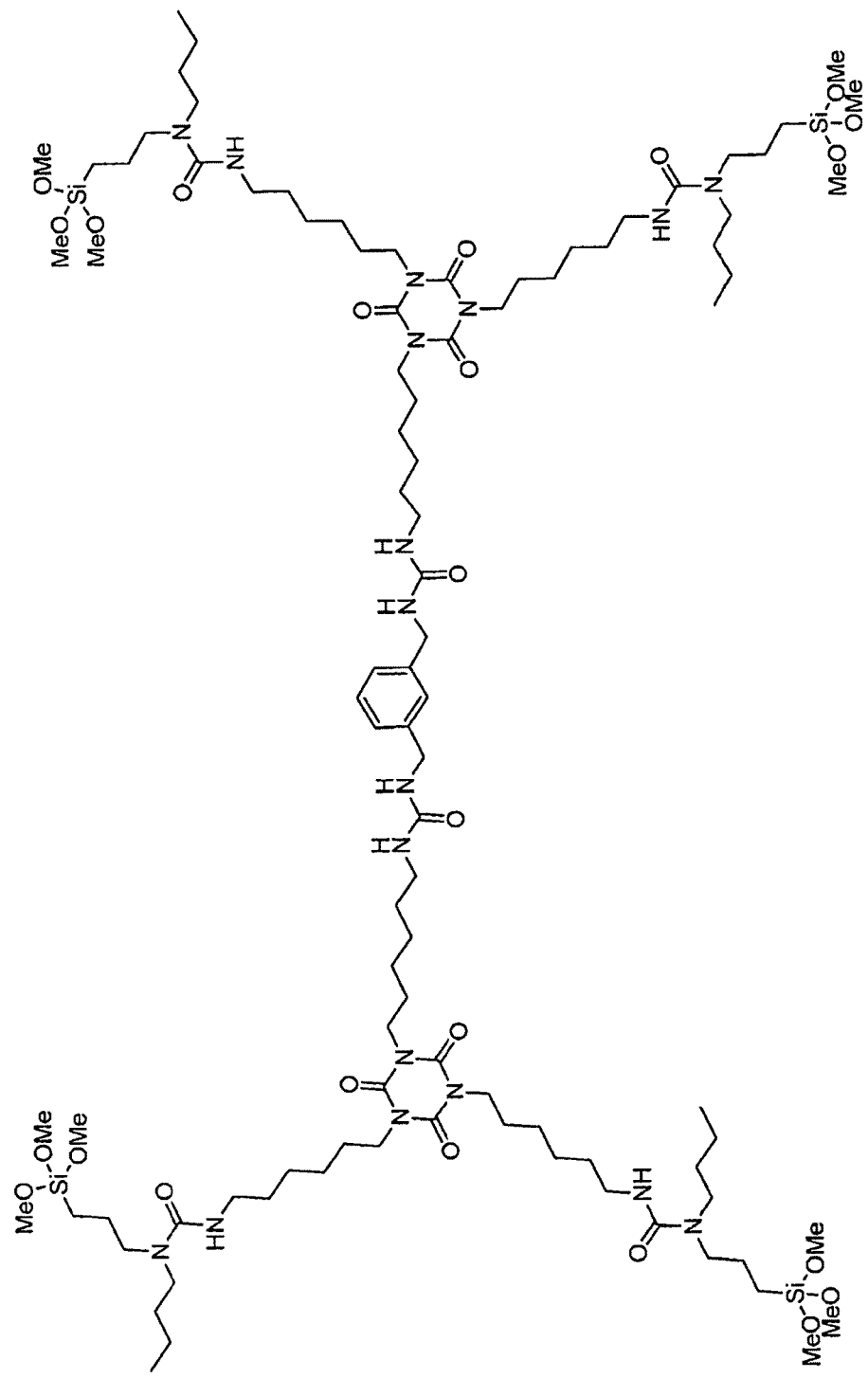
FIG. 8 shows a polyurea based on an aromatic diamine.

The structure in FIG. 8 is an example of an N-substituted urea polymer with terminal alkoxysilanes that is synthesized using an aliphatic polyisocyanate based on a HDI isocyanurate trimer, N-butyl-3-aminopropyltrimethoxysilane (an N-substituted amino-functional alkoxysilane), and 1,3-phenylenedimethanamine (an aromatic diamine). The N-substituted amino-functional alkoxysilane is reacted with ~66% of the isocyanate groups, whereas the diamine is reacted with ~33% of the isocyanate groups.

A reactive diluent also may be used for modifying the properties of the 2K coating, such as increasing the flexibility or hardness, reducing solvent content and viscosity, increasing cleanability, or increasing weatherability (i.e., resistance to exterior degradation from sunlight). The reactive diluent can be a polysiloxane with at least 2 hydrolyzable alkoxysilane groups, such as, but not limited to, poly(dimethoxysiloxane), poly(diethoxysiloxane), methoxy-functional dimethylpolysiloxane, methoxy-functional methylphenylpolysiloxane, ethoxy-functional dimethylpolysiloxane, and structures based on tetraethyl orthosilicate. The reactive diluent can also be hydroxyl-functional versions of these polysiloxanes or hydroxyl propyl terminated polysiloxanes. Many of these are commercially available.

The reactive diluent can also be an alkyl-functional alkoxysilane, where the alkyl group is C1-C16 alkyl, cycloalkyl or fluorinated alkyl, and the alkoxysilane group is trimethoxysilane, triethoxysilane, methyldimethoxysilane, methyldiethoxysilane, dimethylmethoxysilane, and dimethylethoxysilane. Examples include, but are not limited to, propyltrimethoxysilane, hexyltrimethoxysilane, octyltrimethoxysilane, octyltriethoxysilane, hexadecyltrimethoxysilane, cyclohexyltriethoxysilane, (3,3,3-trifluoropropyl)trimethoxysilane, and 1H,1H,2H,2H-perfluorooctyltriethoxysilane.

The reactive diluent can also be a polysiloxane-urea polymer with hydrolysable alkoxysilane groups. These reactive diluents are formed by reacting a polysiloxane with primary diamines, or a polysiloxane with secondary diamines, and 3-isocyanatopropyltrimethoxysilane or 3-isocyanatotriethoxysilane. They can also be formed by reacting a diisocyanate-functional polysiloxane with an N-substituted 3-aminopropylalkoxysilane. The polysiloxane can be a dimethylpolysiloxane or methylphenylpolysiloxane. The N-substituted groups of the secondary diamines (attached to the polysiloxane) and N-substituted 3-aminopropylalkoxysilane can be C1-C12 alkyl, cycloalkyl, aryl, or ester-containing aliphatic. The alkoxysilane group of the N-substituted 3-aminopropylalkoxysilane can be trimethoxysilane, triethoxysilane, methyldimethoxysilane, methyldiethoxysilane, dimethylmethoxysilane, and dimethylethoxysilane. There are several commercial sources of the raw materials for synthesizing these reactive diluents. Example structures of these synthesized reactive diluents include, but are not limited to, the following:

| Structure | Name |
|---|---|
| (EtO)₃Si—...—Si(OEt)₃ structure with urea linkages, N-ethyl substituents, and branched methyl groups on a polydimethylsiloxane backbone | bis((3-triethoxysilyl)propyl)urea adduct based on N,N'-ethylaminoisobutyl terminated polydimethylsiloxane |
| (EtO)₃Si—...—Si(OEt)₃ structure with urea linkages on a polydimethylsiloxane backbone | bis((3-triethoxysilyl)propyl)urea adduct based on aminopropyl terminated polydimethylsiloxane |
| (MeO)₃Si—...—Si(OMe)₃ structure with N-butyl substituted urea linkages, dicyclohexylmethane groups, and carbamate linkages on a polydimethylsiloxane backbone | bis(N-substituted 3-aminopropylalkoxysilane) urea adduct based on diisocyanate-functional polydimethylsiloxane |

Reactive diluents that contain N-substituted urea groups are used due to their reduced hydrogen bonding character, lower viscosity and reduced solvent requirements.

The reactive diluent can also be an aliphatic or cycloaliphatic N-substituted urea with hydrolysable alkoxysilane groups. These reactive diluents are formed by reacting an aliphatic or cycloaliphatic secondary diamine with 3-isocyanatopropyltrimethoxysilane or 3-isocyanatotriethoxysilane. The 3-isocyanatopropyltrimethoxysilane and 3-isocyanatotriethoxysilane are both commercially available. Suitable secondary diamines are the same as those utilized for synthesizing the N-substituted urea polymer with terminal alkoxysilanes. Example structures of these synthesized reactive diluents include, but are not limited to, the following:

| Structure | Name |
|---|---|
| 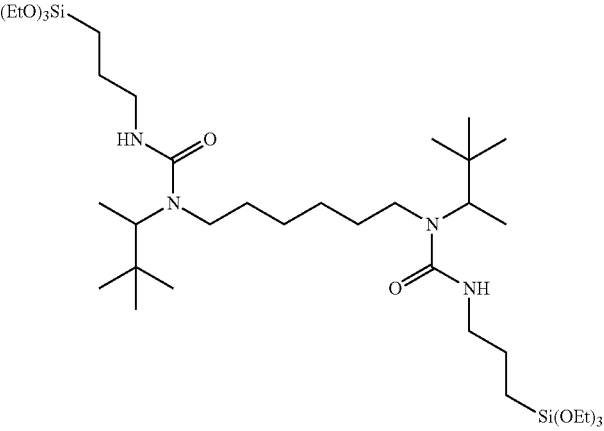 | 1,1'-(hexane-1,6-diyl)bis(1-(3,3-dimethylbutan-2-yl)-3-(3-(triethoxysilyl)propyl)urea) |
| 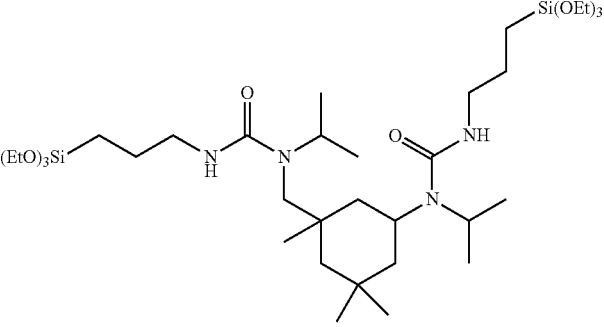 | 1-isopropyl-1-((5-(1-isopropyl-3-(3-(triethoxysilyl)propyl)ureido)-1,3,3-trimethylcyclohexyl)methyl)-3-(3-(triethoxysilyl)propyl)urea |
| 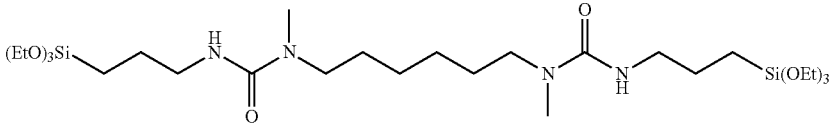 | 1,1'-(hexane-1,6-diyl)bis(1-methyl-3-(3-(triethoxysilyl)propyl)urea) |
| 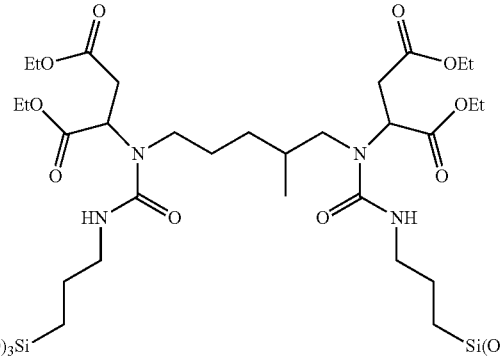 | tetraethyl 2,2'-(4,4,22,22-tetraethoxy-12-methyl-9,17-dioxo-3,23-dioxa-8,10,16,18-tetraaza-4,22-disilapentacosane-10,16-diyl)disuccinate |

The reactive diluent can also be a polyester-urethane polymer with hydrolyzable alkoxysilane groups. These reactive diluents are formed by reacting an aliphatic or cycloaliphatic polyester polyol with 3-isocyanatopropyltrimethoxysilane, 3-isocyanatopropyltriethoxysilane, or (isocyanatomethyl)trimethoxysilane. The polyester polyol should be linear or slightly branched, and can be utilized to provide increased flexibility. Suitable polyester polyols include unsaturated polyesters, such as 1,3-benzenedicarboxylic acid, polymer with 2,2-dimethyl-1,3-propanediol, 1,2-ethanediol, hexanedioic acid, and 1,6-hexanediol, and saturated polyesters such as those based on caprolactone. Many polyester polyols are commercially available. The 3-isocyanatopropyltrimethoxysilane, 3-isocyanatotriethoxysilane and (isocyanatomethyl)trimethoxysilane are also commercially available.

Suitable solvents for synthesis of the polyurea are those that are not reactive with isocyanate groups. These solvents include, but are not limited to, xylenes, light aromatic naphtha, mineral spirits, butyl acetate, 1-methoxy-2-propyl acetate, tert-butyl acetate, butyl propionate, pentyl propionate, ethyl 3-ethoxypropionate, parachlorobenzotrifluoride, tetrahydrofuran, 1,4-dioxane, dimethylacetamide, and N-methyl pyrrolidone.

The second component (part B) includes the epoxy- or acrylate-functional compound, which may be any compound that includes an amine-reactive epoxy or acrylate group, or any mixture of such compounds. Suitable epoxy- or acrylate-functional compounds include, but are not limited to, an epoxy-functional dimethylpolysiloxane, an epoxy-functional polydimethyldiphenylsiloxane, an aliphatic epoxy, a cycloaliphatic epoxy, an acrylate-functional dimethylpolysiloxane, or 1,6-hexanedioldiacrylate.

A catalyst may be used to accelerate the rate of hydrolysis of the alkoxysilane groups and to facilitate crosslinking of the resulting silanol groups to form a cured coating. Suitable catalysts include, but are not limited to, organic tin compounds, such as dibutyl tin dilaurate, dibutyl tin diacetate, and dibutyl tin bis(2-ethylhexoate), metal alkoxides, such as titanium tetraisopropoxide, aluminum triethoxide, and zirconium tetrabutoxide, titanium chelates, alkalines, such as potassium hydroxide, organic acids, inorganic acids, tertiary amines, or mixtures thereof.

Suitable pigments include, but are not limited to, titanium dioxide, carbon black, red iron oxide, yellow iron oxide, copper phthalocyanine blue, sodium aluminum sulphosilicate, chromium oxide, cobalt chromite green spinel, chromium green-black hematite, nickel antimony titanium yellow rutile, and manganese-based pigments.

Suitable fillers include, but are not limited to, amorphous silica, functionalized silica, talc, mica, wollastonite, calcium carbonate, glass beads, graphite, polymeric waxes, acrylic beads, polyurethane beads, and ceramic microspheres.

Suitable additives include, but are not limited to, rheology modifiers, thickening agents, adhesion promoters, reinforcing agents, wetting and dispersing agents, anti-floating agents, flame retardants, ultraviolet (UV) absorbers, hindered amine light stabilizers (HALS), and flow and leveling agents.

The two components may be provided as a kit having each of the components in its own container. The two component system may also be described as a coating composition comprising the amine-functional compound, the alkoxysilane-terminated polyurea, and the epoxy- or acrylate-functional compound.

The 2K coating can be applied to a variety of substrates. Suitable substrates include, but are not limited to, epoxy primed surfaces, polyurethane primed surfaces, pretreatments, epoxy-based composites, weathered or abraded silicone alkyd coatings, weathered or abraded polysiloxane coatings, bare steel surfaces, bare aluminum surfaces, bare aluminum alloy surfaces, concrete, glass, ceramics, and plastics.

When the two components are mixed and applied to a surface, they may cure to form a solid coating. As in other 2K systems, the amine groups of the amine-functional compound in the first component react with the epoxy-functional compound in the second component. When the amine-functional compound includes alkoxysilane groups, these groups may also hydrolyze and condense as shown below. The alkoxysilane groups of the polyurea may also undergo hydrolysis and condensation with each other and with those of the amine-functional compound.

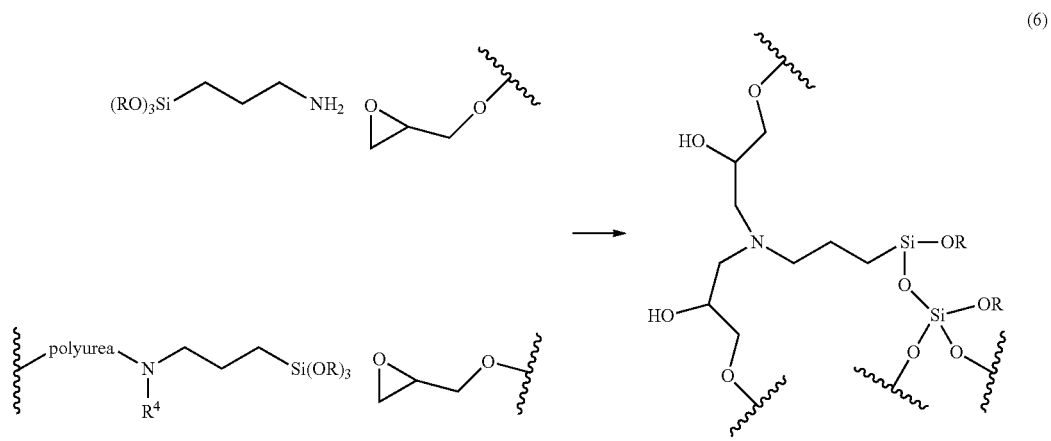

(6)

When the second component includes the acrylate-functional compound, the amine groups of the amine-functional compound undergo a Michael addition with the acrylate groups as shown below.

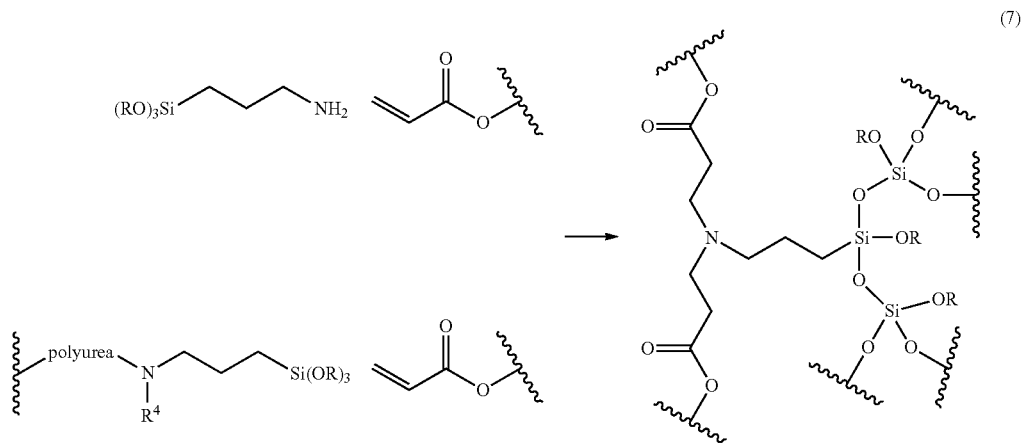

(7)

Any of the polyureas disclosed herein may be used in a 1K system where the polyurea is moisture cured as described above. The moisture curing may occur in the absence of other compounds that crosslink with the polyurea. Any of the polyureas may also be used in 2K systems, coating compositions, and kits where one component contains the polyurea and either an amine-functional compound or an epoxy- or acrylate-functional compound, and the other component contains the other of the amine-functional compound and the epoxy- or acrylate-functional compound. In 2K systems, the polyurea may be up to 50, 90, or 95 wt % of the total of the mixed components.

The polyureas may generally be made, among other methods, by a two-step process. First, the amino-functional alkoxysilane is reacted with the polyisocyanate. This forms an adduct having an unreacted isocyanate group as shown above in Eq. (1). The adduct is then reacted with one or more polyfunctional amino- and/or hydroxyl compounds and optionally additional polyisocyanate. In some embodiments, the adduct is reacted with a combination of two or more different such compounds. For example, the adduct may be reacted with both a diamine and a diol. In some embodiments, the compounds collectively contain both amine and hydroxyl groups, such as the previously stated diamine and diol combination, or the compound may be a single amino-hydroxyl compound. Any free isocyanate groups do not react with other isocyanate groups in this reaction.

Figure 9:
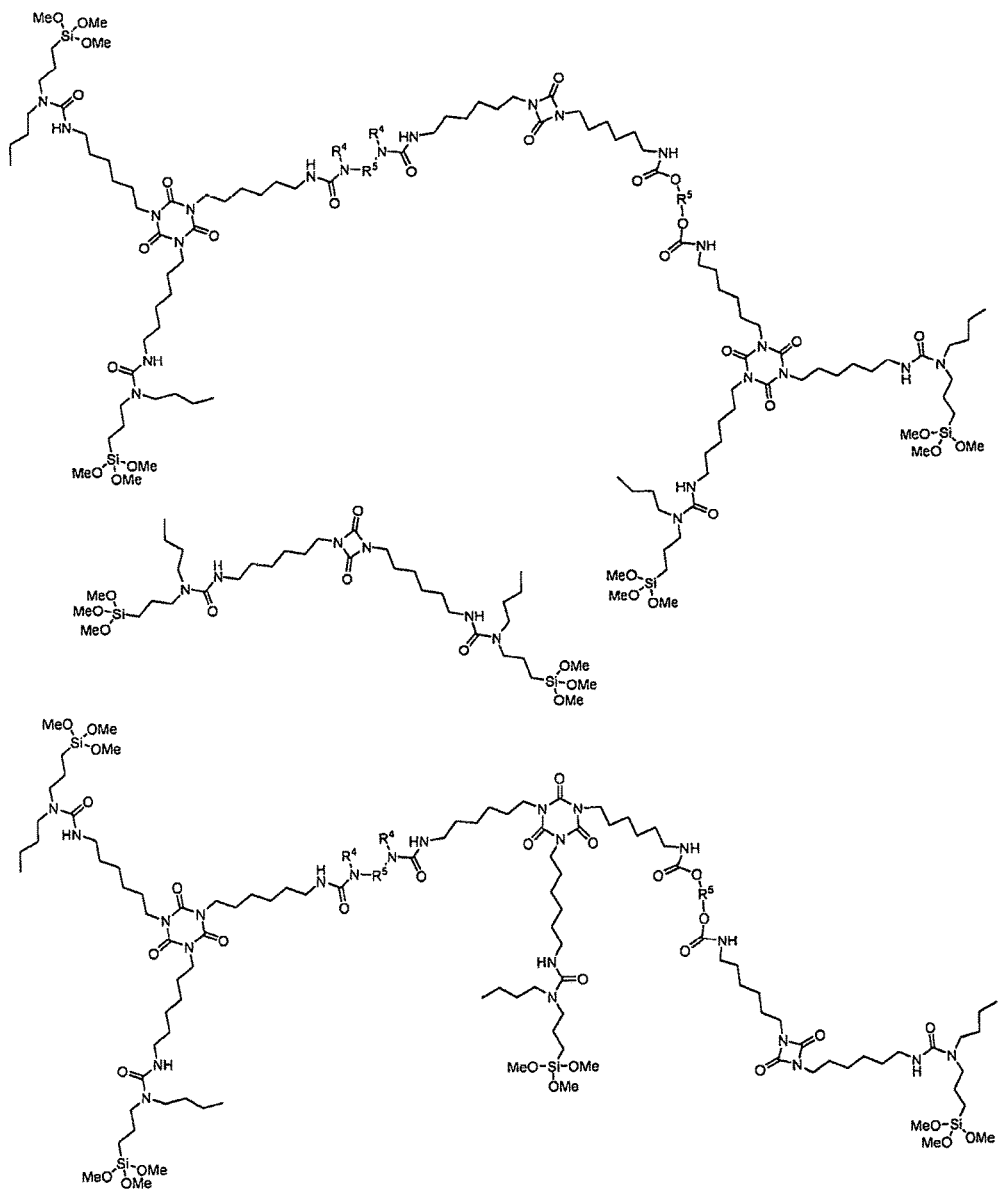
FIG. 9 shows a variety of compounds made from a single reaction.

The reaction may produce a composition having a blend of products having different arrangements of the reactants. Individual products may have no unreacted isocyanate groups. FIG. 9 shows a number of possible products that could be present in the composition when using N-butyl-3-aminopropyltrimethoxysilane, hexamethylene diisocyanate (dimer and trimer), a diamine, and a polyester diol. Certain compounds in the composition may have the formula of Eqs. (2), (3), or (8). Eq. (8), where m is 2 or 3 and each n is 1 or 2, depicts a compound having (from right to left) a central polyisocyanate residue bound to 2 or 3 difunctional amino and/or hydroxyl compound residues, each of which is bound to another polyisocyanate residue, each of which is bound to 1 or 2 amino-functional alkoxysilane residues. Eqs. (2) and (3) show simpler compounds having a single, central diamine or diol residue bound to two polyisocyanate residues, each of which is bound to one or more amino-functional alkoxysilane residues.

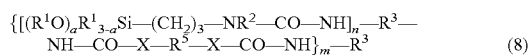

(8)

The following examples are given to illustrate specific applications. These specific examples are not intended to limit the scope of the disclosure in this application. For examples that show only a polyurea synthesis, the polyurea may be used in the 2K system.

Example 1

Aspartic Ester-Containing Backbone—

86 g (0.445 equiv.) of a hexamethylene diisocyanate homopolymer with mostly isocyanurate trimer structure was dissolved in 74 g of pentyl propionate in a 500 mL 3-neck round bottom flask equipped with an Argon inlet and thermometer. This was followed by the addition of 5 g of vinyltrimethoxysilane as a drying agent. Using an addition funnel, 70.14 g (0.298 equiv.) of N-butyl-3-aminopropyltrimethoxysilane was added dropwise to the solution while keeping the temperature at 40-50° C. Next, 34.4 g (0.147 equiv.) of tetraethyl 2,2'-((2-methylpentane-1,5-diyl)bis(azanediyl))disuccinate (also known as aspartic acid, N,N'-(2-methyl-1,5-pentanediyl)bis-1,1',4,4'-tetraethyl ester) was added dropwise while continuing to keep the temperature at 40-50° C. After the addition was complete, the solution was stirred for an additional 30 minutes until the infrared (IR) spectrum indicated that no more free isocyanate (NCO) (2270 cm$^{-1}$) remained in solution. The polymer solution was calculated to have a solids content of 72.5% by weight. The main polymer structure is shown in FIG. 1.

A flat/matte gray coating was obtained using the following two-component formulation:

|  | Weight % of formula |
|---|---|
| Part A |  |
| Dibutyltin dilaurate | 0.25 |
| Amino-functional polydimethylsiloxane | 17.61 |
| Flexible polymer solution (FIG. 1) | 8.76 |
| Part B |  |
| Cycloaliphatic epoxy | 14.04 |
| Epoxy-functional polydimethyldiphenylsiloxane | 11.09 |
| Titanium dioxide | 6.41 |
| Carbon black | 0.085 |
| Polyurea matting agent | 8.55 |
| Pentyl propionate | 18.25 |
| Ceramic microspheres | 14.96 |

The two parts were mixed at a 2:1 (B to A) ratio by volume and applied on aluminum and tinplate panels using a 3 mil (~75 microns) wet film gauge. The coating was then allowed to cure at ambient conditions for 14 days. The coating demonstrated a tack-free time of <1 hour, a dry-hard time of <2 hours, a 60° gloss of 0.6 gloss units, an 85° gloss of 4.7 gloss units, a Konig pendulum hardness of 17 oscillations, a resistance of 100+ double rubs to a methyl ethyl ketone (MEK) soaked rag, a ¼" Mandrel Bend flexibility without cracking, and a GE Impact Flexibility of 40% elongation. The coating has also demonstrated outstanding color retention when subjected to accelerated weathering in a Xenon-Arc Weatherometer (WOM) chamber.

Two-component gloss white topcoats have also been formulated. An example of a coating with a 1:1 (A to B) mix ratio by volume is as follows:

|  | Weight % of formula |
|---|---|
| Part A |  |
| Dibutyltin dilaurate | 0.30 |
| Amino-functional polydimethyldiphenylsiloxane | 26.1 |
| 3-aminopropyltriethoxysilane | 1.32 |
| Flexible polymer solution | 10.83 |
| Butyl propionate | 3.14 |
| Part B |  |
| Cycloaliphatic epoxy | 25.8 |
| Titanium dioxide | 22.86 |
| Butyl propionate | 9.65 |

Example 2

Other Backbones—

Figure 2:
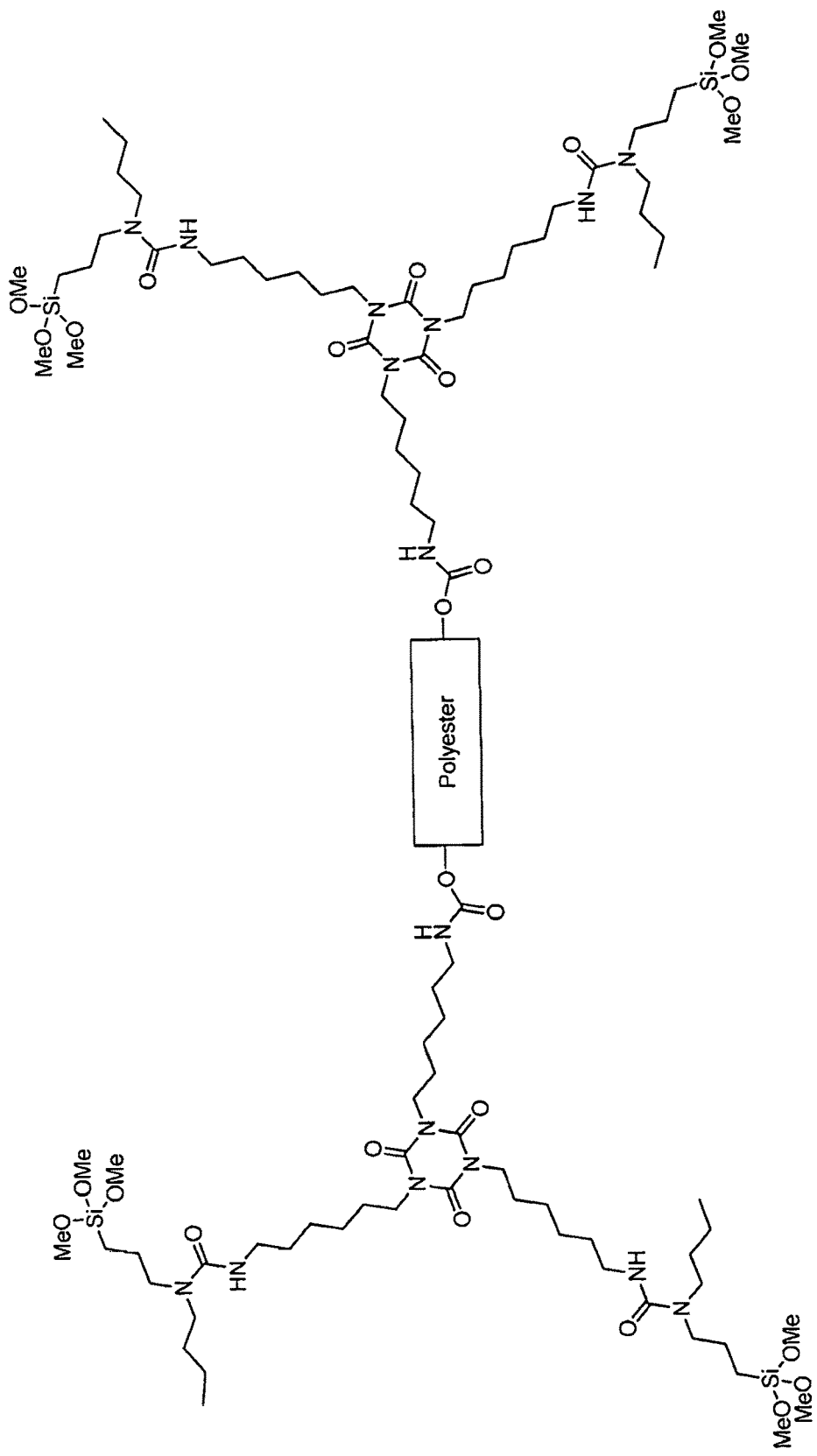
FIG. 2 shows a polyurea having polyester backbone.
Figure 3:
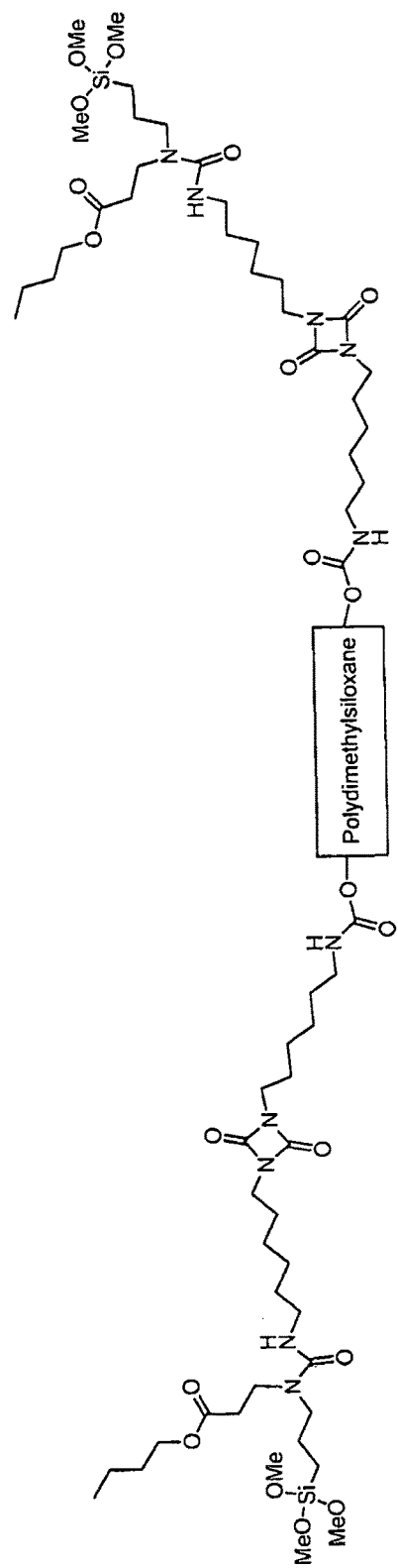
FIG. 3 shows a polyurea having a polysiloxane backbone and ester-containing N-substituted groups.

The flexible backbone of the urea polymers can be aliphatic, cycloaliphatic, aromatic, polyester, polyurethane, polycarbonate, polyether, polysulfide, polysiloxane or a combination thereof, and the N-substituted groups can be C1-C12 alkyl, cycloalkyl, aryl, ester-containing aliphatic, ester-containing fluorinated aliphatic, amide-containing aliphatic, polysiloxane, or any combination thereof. An example of a polymer with a polyester backbone and N-butyl substituted urea linkages is shown in FIG. 2. An example of a polymer with a polydimethylsiloxane backbone and ester-containing N-substituted groups is shown in FIG. 3.

Example 3

Bending Test—

Figure 4:
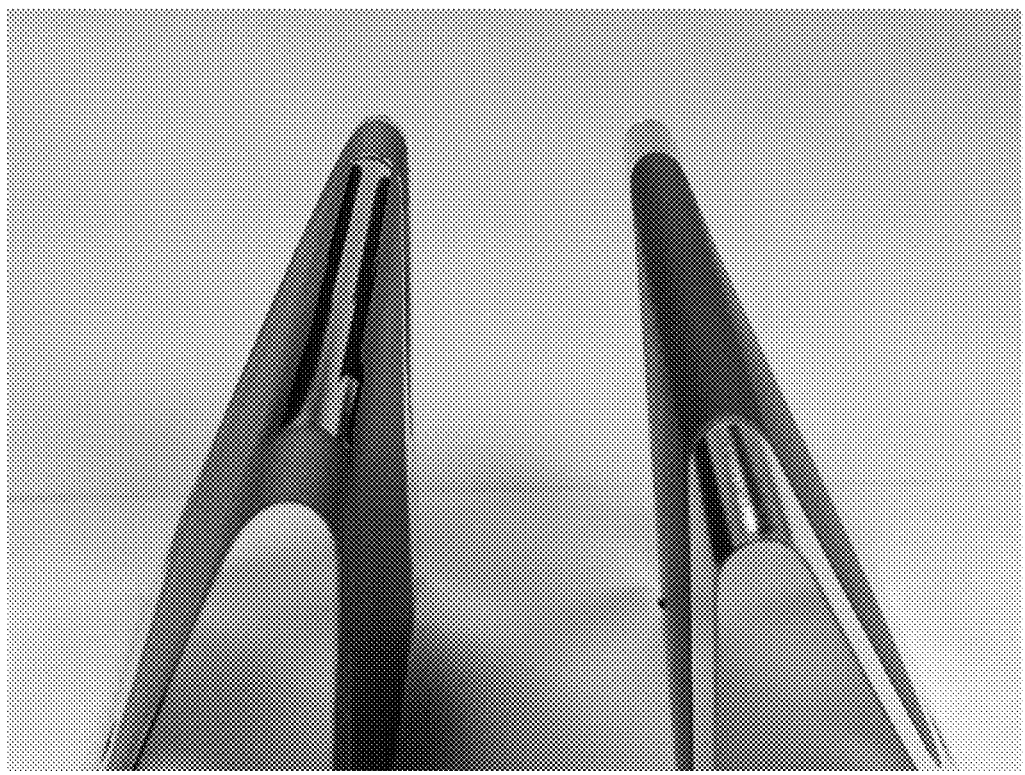
FIG. 4 shows the results of bending tests of the prior (left) and present (right) coatings.

A ¼" Cylindrical Mandrel Bend was performed on the samples. FIG. 4 is a photograph showing the results of the bend test on a prior 2K coating (left) that does not contain the polyurea polymer compared to the presently disclosed coating (right) that does contain the polyurea polymer. The prior coating shows cracking along the bend while the present coating does not.

Example 4

Polyurea Based on an Aliphatic Polyisocyanate, N-Alkyl Amino-Functional Alkoxysilanes, and a Cycloaliphatic Secondary Diamine with N-Alkyl Groups—

81.6 g (0.446 equiv.) of a hexamethylene diisocyanate homopolymer with isocyanurate trimer structure was dissolved in 115 g of Aromatic 100 (commercially available from Exxon) in a 500 mL 3-neck round bottom flask equipped with an Argon inlet and thermometer. This was followed by the addition of 5 g of vinyltrimethoxysilane as a drying agent. Using an addition funnel, 71.38 g (0.303 equiv.) of N-butyl-3-aminopropyltrimethoxysilane was added dropwise to the solution while keeping the temperature at 40-50° C. Next, 18.78 g (0.147 equiv.) of N-isopropyl-3-((isopropylamino)methyl)-3,5,5-trimethylcyclohexanamine was added dropwise while continuing to keep the temperature at 40-50° C. After the addition was complete, the solution was stirred for an additional 15-30 minutes until the infrared (IR) spectra indicated that no more free isocyanate (NCO) (2270 cm$^{-1}$) remained in solution. The polymer solution was calculated to have a solids content of 60.6% by weight. The structure is shown in FIG. 5.

Example 5

Polyurea Based on an Aliphatic Polyisocyanate, N-Substituted Amino-Functional Alkoxysilanes with Butyl Ester-Containing Groups, and an Aliphatic Secondary Diamine with N-Alkyl Groups—

35.5 g (0.194 equiv.) of a hexamethylene diisocyanate homopolymer with isocyanurate trimer structure was dissolved in 60 g of Aromatic 100 solvent (commercially available from Exxon) in a 500 mL 3-neck round bottom flask equipped with an Argon inlet and thermometer. This was followed by the addition of 2 g of vinyltrimethoxysilane as a drying agent. Using an addition funnel, 40 g (0.130 equiv.) of butyl 3-((3-(trimethoxysilyl)propyl)amino)propanoate (synthesized by reacting 3-aminopropyltrimethoxysilane with butyl acrylate via a Michael Addition reaction) was added dropwise to the solution while keeping the temperature at 40-50° C. Next, 4.17 g (0.064 equiv.) of N$^1$,N$^3$-diethylpropane-1,3-diamine was added dropwise while continuing to keep the temperature at 40-50° C. After the addition was complete, the solution was stirred for an additional 15-30 minutes until the infrared (IR) spectra indicated that no more free isocyanate (NCO) (2270 cm$^{-1}$) remained in solution. The polymer solution was calculated to have a solids content of 57.6% by weight. The structure is shown in FIG. 6.

Example 6

Polyurea Based on an Aliphatic Polyisocyanate, N-Substituted Amino-Functional Alkoxysilanes with Butyl-Containing Groups, a Cycloaliphatic Secondary Diamine with N-Alkyl Groups, and a Polyester Diol—

A moisture-curable polymer was synthesized by adding 70.14 g of N-butyl-3-aminopropyltrimethoxysilane (SIB1932.2, Gelest) dropwise to a solution of 86 g of an aliphatic polyisocyanate mixture based on hexamethylene diisocyanate dimers and trimers (Desmodur N-3400, Covestro) and 5 g of vinyltrimethoxysilane (Sigma-Aldrich) in 100 g of pentyl propionate (Sigma-Aldrich) in a 500 mL round bottom flask under nitrogen. The temperature was kept at 50-60° C. for the entire addition. This was followed by the addition of 0.14 g of dibutyltin dilaurate (Sigma-Aldrich). A solution of 35.65 g of a polyester diol (Desmophen 670, Covestro) and 9.39 g of cycloaliphatic secondary diamine 1,3,3-trimethyl-N-(1-methylethyl)-5-[(1-methylethyl)amino]cyclohexanemethanamine (Jefflink 754, Huntsman) in 90 g of pentyl propionate was then added dropwise to the solution of polyisocyanate. After the addition was complete the reaction was stirred for 3 hours. This was followed by 5.24 g of N-butyl-3-aminopropyltrimethoxysilane and stirring for an additional 10 minutes. FTIR showed that all of the isocyanate groups has been consumed.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A urea-containing composition made by a method comprising:
    reacting an amino-functional alkoxysilane with a first polyisocyanate to form one or more adducts having an unreacted isocyanate group; and
    reacting the adducts with one or more polyfunctional amino- and/or hydroxyl compounds and a second polyisocyanate to form the urea-containing composition;
        wherein at least one of the polyfunctional amino- and/or hydroxyl compounds comprises an amino group;
        wherein at least one of the polyfunctional amino- and/or hydroxyl compounds comprises a hydroxyl group;
        wherein isocyanate groups do not react with other isocyanate groups;
        wherein the urea-containing composition comprises at least two residues of the polyfunctional amino- and/or hydroxyl compounds; and
        wherein the urea-containing composition contains no unreacted isocyanate groups.

2. The urea-containing composition of claim 1, wherein the urea-containing composition comprises one of more compounds having the formula:

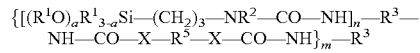

wherein each a is independently selected from 1, 2, or 3;
wherein m is 2 or 3;
wherein each n is independently selected from 1 or 2;
wherein each X is independently selected from —NR$^4$— and —O—;
wherein each R$^1$ group is an independently selected alkyl group;
wherein each R$^2$ and R$^4$ is independently selected from hydrogen, aryl, alkyl, cycloalkyl, ester-containing aliphatic, ester-containing fluorinated aliphatic, amide-containing aliphatic, and polysiloxane;
wherein each R$^3$ is an independently selected residue of an aliphatic, cycloaliphatic, or aromatic polyisocyanate having 2 or 3 isocyanate groups; and
wherein each R$^5$ independently comprises a group selected from aliphatic, cycloaliphatic, aromatic, polyester, polyether, polysulfide, polyurethane, polycarbonate, polysiloxane, and any combination thereof.

3. The urea-containing composition of claim 2, wherein the compound comprises two or more different R$^5$ groups.

4. The urea-containing composition of claim 3, wherein the urea-containing composition comprises one of more compounds having the formula:

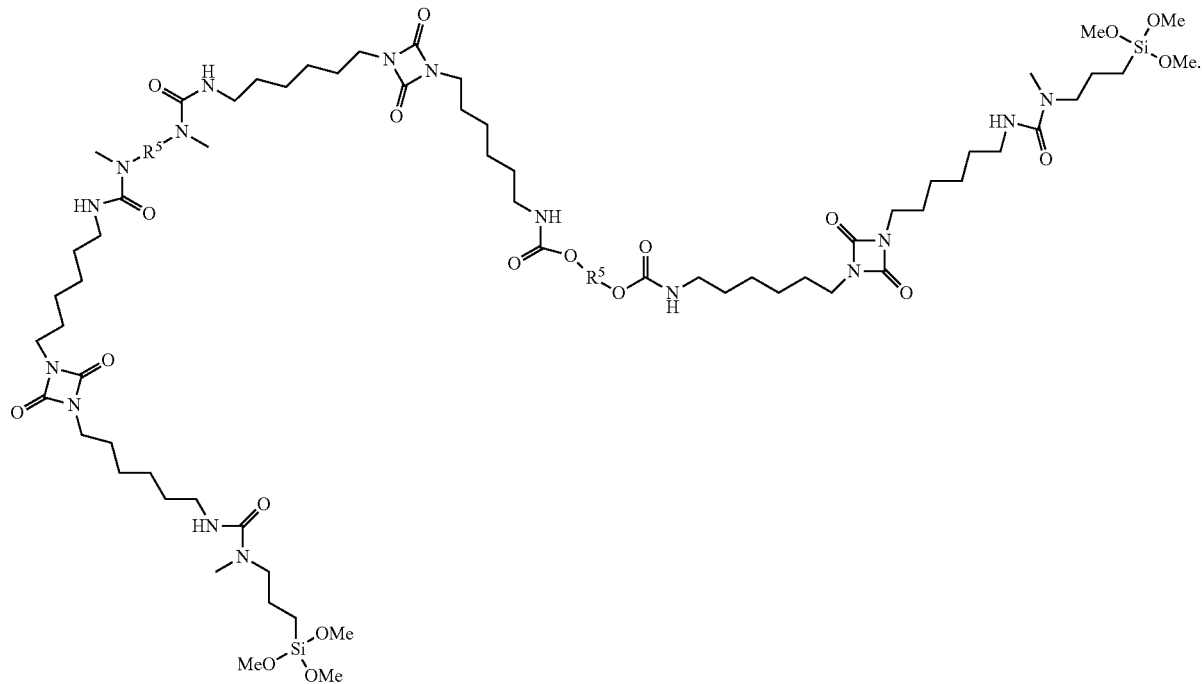

5. The urea-containing composition of claim 3, wherein the urea-containing composition comprises one of more compounds having the formula:

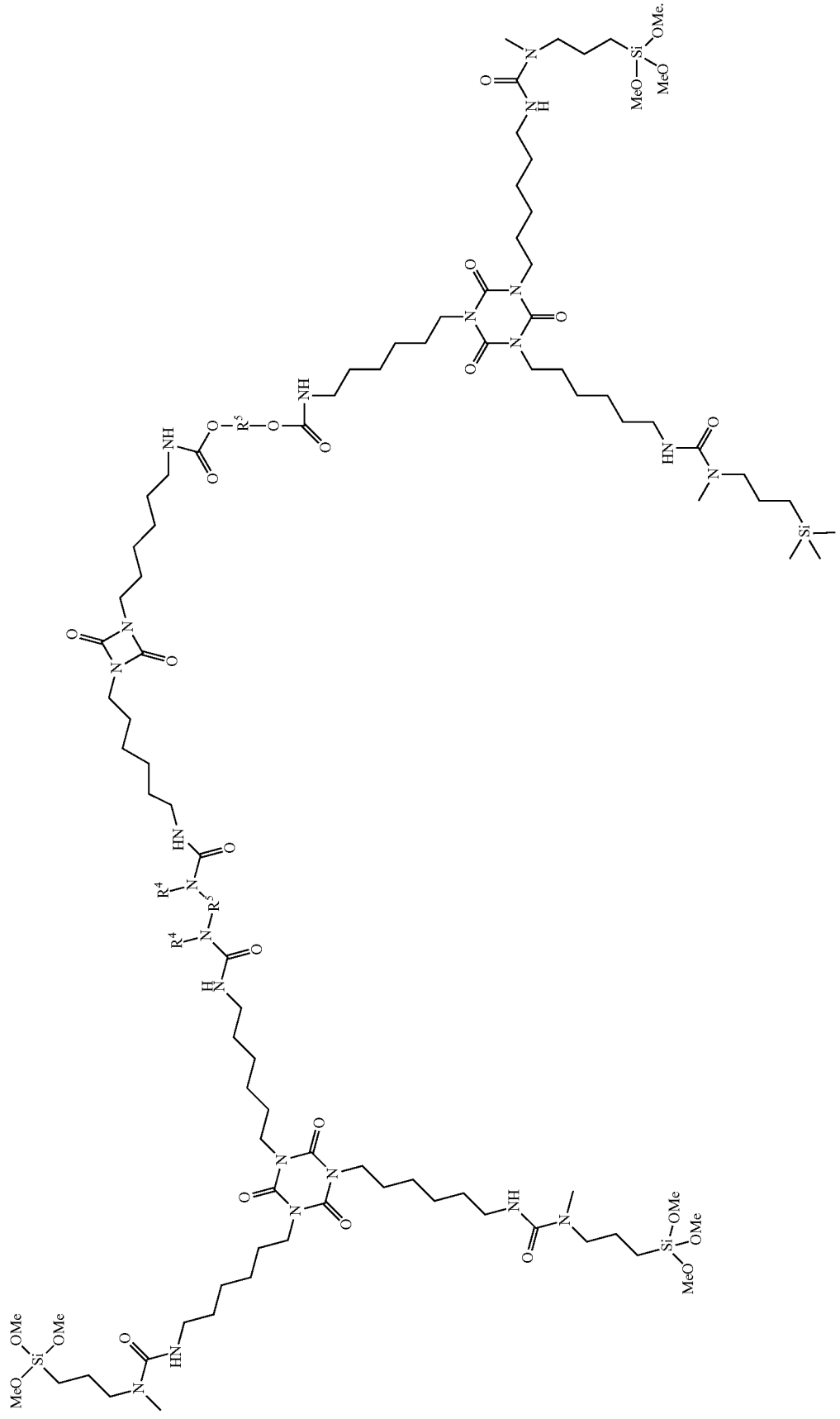

6. A method comprising:
providing a urea-containing composition made by a method comprising:
  reacting an amino-functional alkoxysilane with a first polyisocyanate to form one or more adducts having an unreacted isocyanate group; and
  reacting the adducts with one or more polyfunctional amino- and/or hydroxyl compounds and a second polyisocyanate to form the urea-containing composition;
  wherein the urea-containing composition comprises at least two residues of the polyfunctional amino- and/or hydroxyl compounds;
  wherein isocyanate groups do not react with other isocyanate groups; and
  wherein the urea-containing composition contains no unreacted isocyanate groups; and
moisture-curing the urea-containing composition;
  wherein the urea-containing composition is characterized by any of:
    a) at least one of the polyfunctional amino- and/or hydroxyl compounds is a polyfunctional amino compound; and
    b) the urea-containing composition comprises one of more compounds having the formula:

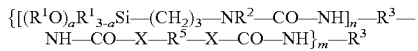
$\{[(R^1O)_a R^1_{3-a}Si-(CH_2)_3-NR^2-CO-NH]_n-R^3-NH-CO-X-R^5-X-CO-NH\}_m-R^3$ wherein each a is independently selected from 1, 2, or 3;
  wherein m is 2 or 3;
  wherein each n is independently selected from 1 or 2;
  wherein each X is independently selected from —NR⁴— and —O—;
  wherein each $R^1$ group is an independently selected alkyl group;
  wherein each $R^2$ and $R^4$ is independently selected from hydrogen, aryl, alkyl, cycloalkyl, ester-containing aliphatic, ester-containing fluorinated aliphatic, amide-containing aliphatic, and polysiloxane;
  wherein each $R^3$ is an independently selected residue of an aliphatic, cycloaliphatic, or aromatic polyisocyanate having 2 or 3 isocyanate groups; and
  wherein each $R^5$ independently comprises a group selected from aliphatic, cycloaliphatic, aromatic, polyester, polyether, polysulfide, polyurethane, polycarbonate, polysiloxane, and any combination thereof moisture-curing the composition.

7. A coating made by the method of claim 6.

8. A composition comprising:
an amine-functional compound or an epoxy- or acrylate-functional compound; and
a urea-containing composition made by a method comprising:
  reacting an amino-functional alkoxysilane with a first polyisocyanate to form one or more adducts having an unreacted isocyanate group; and
  reacting the adducts with one or more polyfunctional amino- and/or hydroxyl compounds and a second polyisocyanate to form the urea-containing composition;
  wherein the urea-containing composition comprises at least two residues of the polyfunctional amino- and/or hydroxyl compounds;
  wherein isocyanate groups do not react with other isocyanate groups; and
  wherein the urea-containing composition contains no unreacted isocyanate groups;
  wherein the urea-containing composition is characterized by any of:
    a) at least one of the polyfunctional amino- and/or hydroxyl compounds comprises an amino group and at least one of the polyfunctional amino- and/or hydroxyl compounds comprises a hydroxyl group;
    b) at least one of the polyfunctional amino- and/or hydroxyl compounds is a polyfunctional amino compound; and
    c) the urea-containing composition comprises one of more compounds having the formula:

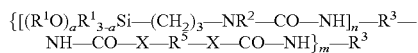
$\{[(R^1O)_a R^1_{3-a}Si-(CH_2)_3-NR^2-CO-NH]_n-R^3-NH-CO-X-R^5-X-CO-NH\}_m-R^3$ wherein each a is independently selected from 1, 2, or 3;
  wherein m is 2 or 3;
  wherein each n is independently selected from 1 or 2;
  wherein each X is independently selected from —NR⁴— and —O—;
  wherein each $R^1$ group is an independently selected alkyl group;
  wherein each $R^2$ and $R^4$ is independently selected from hydrogen, aryl, alkyl, cycloalkyl, ester-containing aliphatic, ester-containing fluorinated aliphatic, amide-containing aliphatic, and polysiloxane;
  wherein each $R^3$ is an independently selected residue of an aliphatic, cycloaliphatic, or aromatic polyisocyanate having 2 or 3 isocyanate groups; and
  wherein each $R^5$ independently comprises a group selected from aliphatic, cycloaliphatic, aromatic, polyester, polyether, polysulfide, polyurethane, polycarbonate, polysiloxane, and any combination thereof moisture-curing the composition.

9. The composition of claim 8, wherein the composition further comprises one or more of a catalyst, a reactive diluent, a solvent, a filler, a pigment, or an additive.

10. The composition of claim 8, wherein the amine-functional compound is a monoamine, diamine, or triamine.

11. The composition of claim 8, wherein the amine-functional compound is an amino-functional polydimethylsiloxane, an amino-functional polydimethyldiphenylsiloxane, 3-aminopropyltriethoxysilane, 3-aminopropyltrimethoxysilane, 3-aminopropylmethyldiethoxysilane, 1-aminomethyltrimethoxysilane, an aliphatic monoamine, an aliphatic diamine, a cycloaliphatic diamine, or an amino-functional polyether.

12. The composition of claim 8, wherein the composition does not comprise both the amine-functional compound and the epoxy- or acrylate-functional compound.

13. The composition of claim 8, wherein the composition comprises both the amine-functional compound and the epoxy- or acrylate-functional compound.

14. The composition of claim 8, wherein the urea-containing composition comprises one of more of the compounds having the formula:

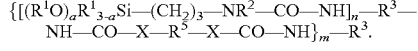
$\{[(R^1O)_a R^1_{3-a}Si-(CH_2)_3-NR^2-CO-NH]_n-R^3-NH-CO-X-R^5-X-CO-NH\}_m-R^3.$ 15. The composition of claim 14, wherein the compound comprises two or more different $R^5$ groups.

16. The composition of claim 8, wherein the amino-functional alkoxysilane is N-butyl-3-aminopropyltrimethoxysilane, 3-aminopropyltriethoxysilane, 3-aminopropyltrimethoxysilane, 3-aminopropylmethyldiethoxysilane, N-methyl-3-aminopropyltrimethoxysilane, N-butyl-3-aminopropylmethyldimethoxysilane; or N-[3-(trimethoxysilyl)propyl]-β-alanine butyl ester.

17. The composition of claim 8, wherein the first polyisocyanate or the second polyisocyanate is hexamethylene diisocyanate, a homopolymer of hexamethylene diisocyanate, toluene diisocyanate, isophorone diisocyanate, homopolymer of isophorone diisocyanate, methylene diphenyl diisocyanate, or a mixture thereof.

18. The composition of claim 8, wherein the polyfunctional amino- and/or hydroxyl compound is aspartic acid; N,N'-(2-methyl-1,5-pentanediyl)bis-1,1',4,4'-tetraethyl ester; an unsaturated polyester diol; a caprolactone-based polyester diol; a hydroxyl terminated polymethylphenylsiloxane; or a hydroxyl-propyl terminated polydimethylsiloxane.

19. A method comprising:
providing a first composition comprising:
an amine-functional compound; and
a urea-containing composition made by a method comprising:
reacting an amino-functional alkoxysilane with a first polyisocyanate to form one or more adducts having an unreacted isocyanate group; and
reacting the adducts with one or more polyfunctional amino- and/or hydroxyl compounds and a second polyisocyanate to form the urea-containing composition;
wherein the urea-containing composition comprises at least two residues of the polyfunctional amino- and/or hydroxyl compounds;
wherein isocyanate groups do not react with other isocyanate groups; and
wherein the urea-containing composition contains no unreacted isocyanate groups;
providing a second composition having no unreacted isocyanate groups comprising an epoxy- or acrylate-functional compound;
mixing the first composition with the second composition to form a mixture;
applying the mixture to a surface; and
allowing the mixture to cure to a crosslinked polymer.

20. The method of claim 19, wherein the second composition further comprises one or more of a catalyst, a reactive diluent, a filler, a solvent, a pigment, or an additive.

21. The method of claim 19, wherein the amount of the urea-containing composition in the mixture is up to 95 wt % of the mixture.

22. The method of claim 19, wherein the epoxy- or acrylate-functional compound is an epoxy-functional dimethylpolysiloxane, an epoxy-functional polydimethyldiphenylsiloxane, an aliphatic epoxy, a cycloaliphatic epoxy, an acrylate-functional dimethylpolysiloxane, an epoxy-functional urethane, an acrylate-functional urethane, or 1,6-hexanedioldiacrylate.

23. The method of claim 19, wherein the mixture is cured by one more of:
hydrolysis and condensation of alkoxysilane groups; and amine/epoxy or amine/acrylate reactions.

24. The crosslinked polymer made by the method of claim 19; wherein the urea-containing composition is characterized by any of:

a) at least one of the polyfunctional amino- and/or hydroxyl compounds is a polyfunctional amino compound; and
b) the urea-containing composition comprises one of more compounds having the formula:

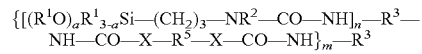

wherein each a is independently selected from 1, 2, or 3;
wherein m is 2 or 3;
wherein each n is independently selected from 1 or 2;
wherein each X is independently selected from $-NR^4-$ and $-O-$;
wherein each $R^1$ group is an independently selected alkyl group;
wherein each $R^2$ and $R^4$ is independently selected from hydrogen, aryl, alkyl, cycloalkyl, ester-containing aliphatic, ester-containing fluorinated aliphatic, amide-containing aliphatic, and polysiloxane;
wherein each $R^3$ is an independently selected residue of an aliphatic, cycloaliphatic, or aromatic polyisocyanate having 2 or 3 isocyanate groups; and
wherein each $R^5$ independently comprises a group selected from aliphatic, cycloaliphatic, aromatic, polyester, polyether, polysulfide, polyurethane, polycarbonate, polysiloxane, and any combination thereof moisture-curing the composition.

25. A method comprising:
providing a second composition having no unreacted isocyanate groups comprising an amino-functional compound;
mixing the composition of claim 8 with the second composition to form a mixture;
wherein the composition of claim 8 comprises the epoxy- or acrylate-functional compound;
applying the mixture to a surface; and
allowing the mixture to cure to a crosslinked polymer.

26. A kit comprising:
a first container containing a composition comprising:
an amine-functional compound; and
a urea-containing composition made by a method comprising:
reacting an amino-functional alkoxysilane with a first polyisocyanate to form one or more adducts having an unreacted isocyanate group; and
reacting the adducts with one or more polyfunctional amino- and/or hydroxyl compounds and a second polyisocyanate to form the urea-containing composition;
wherein the urea-containing composition comprises at least two residues of the polyfunctional amino- and/or hydroxyl compounds;
wherein isocyanate groups do not react with other isocyanate groups; and
wherein the urea-containing composition contains no unreacted isocyanate groups; and
a second container containing a composition having no unreacted isocyanate groups comprising an epoxy- or acrylate-functional compound.

27. A kit comprising:
a first container containing the composition of claim 14;
wherein the composition of claim 14 comprises the epoxy- or acrylate-functional compound; and
a second container containing a composition having no unreacted isocyanate groups comprising the amino-functional compound.

28. A method comprising:
providing a composition comprising a urea-containing composition made by a method comprising:
   reacting an amino-functional alkoxysilane with a polyisocyanate to form an adduct having an unreacted isocyanate group; and
   reacting the adduct with one or more polyfunctional amino- and/or hydroxyl compounds to form the urea-containing composition;
   wherein the urea-containing composition contains no unreacted isocyanate groups; and
moisture-curing the composition;
   wherein the urea-containing composition is characterized by any of:
      a) at least one of the polyfunctional amino- and/or hydroxyl compounds is a polyfunctional amino compound; and
      b) the urea-containing composition comprises one of more compounds having the formula:

$$\{[(R^1O)_aR^1_{3-a}Si—(CH_2)_3—NR^2—CO—NH]_n—R^3—NH—CO—X\}_2—R^5;$$

wherein each a is independently selected from 1, 2, or 3;
   wherein each n is independently selected from 1 or 2;
   wherein each X is independently selected from —NR$^4$— and —O—;
   wherein each R$^1$ group is an independently selected alkyl group;
   wherein each R$^2$ and R$^4$ is independently selected from hydrogen, aryl, alkyl, cycloalkyl, ester-containing aliphatic, ester-containing fluorinated aliphatic, amide-containing aliphatic, and polysiloxane;
   wherein each R$^3$ is an independently selected residue of an aliphatic, cycloaliphatic, or aromatic polyisocyanate having 2 or 3 isocyanate groups; and
   wherein each R$^5$ independently comprises a group selected from aliphatic, cycloaliphatic, aromatic, polyester, polyether, polysulfide, polyurethane, polycarbonate, polysiloxane, and any combination thereof moisture-curing the composition.

29. The method of claim 28, wherein the urea-containing composition comprises the one of more compounds having the formula:

$$\{[(R^1O)_aR^1_{3-a}Si—(CH_2)_3—NR^2—CO—NH]_n—R^3—NH—CO—X\}_2—R^5.$$

30. The method of claim 28, wherein the composition further comprises one or more of a catalyst, a reactive diluent, a solvent, a pigment, an additive, and a filler.

31. A crosslinked polymer made by the method of claim 29.

32. The crosslinked polymer of claim 31, wherein X is —O—.

33. The composition of claim 14, wherein every X is NR$^4$.

34. The method of claim 25, wherein the urea-containing composition comprises one of more of the compounds having the formula:

$$\{[(R^1O)_aR^1_{3-a}Si—(CH_2)_3—NR^2—CO—NH]_n—R^3—NH—CO—X—R^5—X—CO—NH\}_m—R^3.$$

35. A coating made by the method of claim 34.
36. A coating made by the method of claim 25.
37. The method of claim 6;
   wherein urea-containing composition comprises the one of more compounds having the formula:

$$\{[(R^1O)_aR^1_{3-a}Si—(CH_2)_3—NR^2—CO—NH]_n—R^3—NH—CO—X—R^5—X—CO—NH\}_m—R^3;$$

wherein each X is O; and
   wherein R$^2$ is a C7-C12 alkyl group.

38. A crosslinked polymer made by the method of claim 6.

39. The crosslinked polymer of claim 24, wherein the crosslinked polymer is in the form of a coating.

40. The crosslinked polymer of claim 31, wherein the crosslinked polymer is in the form of a coating.

* * * * *